US012412593B2

(12) United States Patent
Ferras Font et al.

(10) Patent No.: US 12,412,593 B2
(45) Date of Patent: Sep. 9, 2025

(54) AUDIO TRANSPOSITION

(71) Applicant: Sony Group Corporation, Tokyo (JP)

(72) Inventors: Marc Ferras Font, Stuttgart (DE); Giorgio Fabbro, Stuttgart (DE); Falk-Martin Hoffmann, Stuttgart (DE); Thomas Kemp, Stuttgart (DE); Stefan Uhlich, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 225 days.

(21) Appl. No.: 18/001,076

(22) PCT Filed: Jun. 14, 2021

(86) PCT No.: PCT/EP2021/065967

§ 371 (c)(1),
(2) Date: Dec. 8, 2022

(87) PCT Pub. No.: WO2021/254961

PCT Pub. Date: Dec. 23, 2021

(65) Prior Publication Data

US 2023/0215454 A1 Jul. 6, 2023

(30) Foreign Application Priority Data

Jun. 16, 2020 (EP) .................................... 20180336

(51) Int. Cl.

| | |
|---|---|
| ***G10L 21/00*** | (2013.01) |
| ***G10L 21/0272*** | (2013.01) |
| ***G10L 25/90*** | (2013.01) |

(52) U.S. Cl.

CPC .......... *G10L 21/0272* (2013.01); *G10L 25/90* (2013.01)

(58) Field of Classification Search

CPC ... G10L 21/0272; G10L 25/90; G10L 21/028; G10L 21/045; G10L 21/047;

(Continued)

(56) References Cited

U.S. PATENT DOCUMENTS

| | | | | |
|---|---|---|---|---|
| 5,296,643 A * | 3/1994 | Kuo | H04H 20/31 | 84/634 |
| 7,974,838 B1 * | 7/2011 | Lukin | G10L 25/90 | 704/207 |

(Continued)

FOREIGN PATENT DOCUMENTS

| | | |
|---|---|---|
| CN | 109272975 A | 1/2019 |
| CN | 110459196 A | 11/2019 |

(Continued)

OTHER PUBLICATIONS

E. Polrolniczak and M. Kramarczyk, "Comparison of singing voice quality from beginning of the phonation and in the stable in the case of choral voices," 2019 Federated Conference on Computer Science and Information Systems (FedCSIS), Leipzig, Germany, 2019, pp. 349-353, doi: 10.15439/2019F316. (Year: 2019).*

(Continued)

*Primary Examiner* — Edgar X Guerra-Erazo
(74) *Attorney, Agent, or Firm* — XSENSUS, LLP

(57) ABSTRACT

An electronic device comprising circuitry configured to separate by audio source separation a first audio input signal into a first vocal signal and an accompaniment, and to transpose an audio output signal by a transposition value based on a pitch ratio, wherein the pitch ratio is based on comparing a first pitch range of the first vocal signal and a second pitch range of the second vocal signal.

20 Claims, 14 Drawing Sheets

(58) Field of Classification Search
CPC ..... G10L 21/049; G10L 21/057; G10L 25/00; G10L 25/51; G10L 25/54; G10L 25/60; G10L 25/69; G10L 25/72; G10L 25/75; G10L 2025/783; G10L 2025/786; G10L 25/81; G10L 25/84; G10L 25/87; G10L 2025/906; G10L 25/93; G10L 2025/935; G10L 2025/932; G10L 2025/937; G10H 1/20; G10H 1/361; G10H 2210/056; G10H 2210/066; G10H 2210/325; G10H 2210/331; G10H 2250/311; G10H 1/22; G10H 1/24; G10H 1/30; G10H 1/28; G10H 1/26; G10H 1/0091; G10H 2210/011; G10H 2210/015; G10H 2210/021; G10H 2210/031; G10H 2210/036; G10H 2210/041; G10H 2210/046; G10H 2210/051; G10H 2210/061; G10H 2210/071; G10H 2210/076; G10H 2210/081; G10H 2210/086; G10H 2210/091; G10H 2210/105; G10H 2210/121; G10H 2210/115; G10H 2210/125; G10H 2210/136; G10H 2210/131; G10H 2210/141; G10H 2210/145; G10H 2210/151; G10H 2210/165; G10H 2210/175; G10H 2210/181; G10H 2210/185; G10H 2210/191; G10H 2210/171; G10H 2210/161; G10H 2210/201; G10H 2210/205; G10H 2210/211; G10H 2210/215; G10H 2210/221; G10H 2210/225; G10H 2210/231; G10H 2210/235; G10H 2210/241; G10H 2210/245; G10H 2210/255; G10H 2210/251; G10H 2210/261; G10H 2210/295; G10H 2210/281; G10H 2210/271; G10H 2220/011; G10H 2220/005; G10H 2220/015; G10H 2220/021; G10H 2220/091; G10H 2220/096; G10H 2220/126; G10H 2220/131
See application file for complete search history.

(56) References Cited

U.S. PATENT DOCUMENTS

| | | | | |
|---|---|---|---|---|
| 8,541,676 | B1 * | 9/2013 | Waldman | G10H 1/0008 84/603 |
| 9,916,821 | B2 | 3/2018 | Pierre-Louis | |
| 2010/0192753 | A1 * | 8/2010 | Gao | G10H 1/366 84/610 |

FOREIGN PATENT DOCUMENTS

| | | | | | |
|---|---|---|---|---|---|
| CN | 110503976 | A | | 11/2019 | |
| JP | H07072881 | A | | 3/1995 | |
| JP | H0719978 | A | * | 8/1995 | |
| JP | H09044174 | A | | 2/1997 | |
| JP | H09097091 | A | | 4/1997 | |
| JP | 2001-22364 | A | | 1/2001 | |
| JP | 2004317934 | A | | 11/2004 | |
| JP | 4106776 | B2 | | 6/2008 | |
| JP | 2011209319 | A | | 10/2011 | |
| JP | 2018107577 | A | | 7/2018 | |
| KR | 10-2020-0065248 | A | | 6/2020 | |
| KR | 20200065248 | A | * | 6/2020 | G10H 1/366 |
| WO | 2011/018985 | A1 | | 2/2011 | |
| WO | WO-2020103550 | A1 | * | 5/2020 | G10L 25/30 |

OTHER PUBLICATIONS

Lienard JS, Di Benedetto MG. Effect of vocal effort on spectral properties of vowels. J Acoust Soc Am. Jul. 1999;106(1):411-22. doi: 10.1121/1.428140. PMID: 10420631. (Year: 1999).*

Wager, S., Tzanetakis, G., Wang, C. I., & Kim, M. (May 2020). Deep autotuner: A pitch correcting network for singing performances. In ICASSP 2020-2020 IEEE International Conference on Acoustics, Speech and Signal Processing (ICASSP) (pp. 246-250). IEEE. (Year: 2020).*

Lattner, S., Grachten, M., & Widmer, G. (2018). Learning transposition-invariant interval features from symbolic music and audio. arXiv preprint arXiv:1806.08236. (Year: 2018).*

G. Degottex, A. Roebel and X. Rodet, "Pitch transposition and breathiness modification using a glottal source model and its adapted vocal-tractfilter," 2011 IEEE International Conference on Acoustics, Speech and Signal Processing (ICASSP), Prague, Czech Republic, 2011, pp. 5128-5131. (Year: 2011).*

International Search Report and Written Opinion mailed on Sep. 21, 2021, received for PCT Application PCT/EP2021/065967, filed on Jun. 14, 2021, 16 pages.

Secrest et al., "An Integrated Pitch Tracking Algorithm for Speech Systems," ICASSP '83, IEEE International Conference on Acoustics, Speech, and Signal Processing, 1983, pp. 1352-1355.

Moorer, "The Optimum Comb Method of Pitch Period Analysis of Continuous Digitized Speech," IEEE Transactions on Acoustics, Speech and Signal Processing, vol. ASSP-22, No. 5, Oct. 1974, pp. 330-338.

Ross et al., "Average Magnitude Difference Function Pitch Extractor" IEEE Transactions on Acoustics, Speech, and Signal Processing, vol. ASSP-22, No. 5, Oct. 1974, pp. 353-362.

Noll, "Cepstrum Pitch Determination," The Journal of the Acoustical Society of America, Available Online At: https://doi.org/10.1121/1.1910339, vol. 41, No. 2, 1967, pp. 293-309.

Wang et al., "Vocal Folds Disorder Detection using Pattern Recognition Methods", Proceedings of the 29th Annual International Conference of the IEEE EMBS, FrP2A1.34, Aug. 23-26, 2007, pp. 3253-3256.

Sondhi, "New Methods of Pitch Extraction," IEEE Transactions on Audio and Electroacoustics, vol. AU-16, No. 2, Jun. 1968, pp. 262-266.

Dobashi et al., "A Music Performance Assistance System Based on Vocal, Harmonic, and Percussive Source Separation and Content Visualization for Music Audio Signals", Available Online at: http://sap.ist.i.kyoto-u.ac.jp/EN/bib/intl/DOB-SMC15.pdf, Jun. 19, 2015, 6 pages.

Schroeder, "Period Histogram and Product Spectrum: New Methods for Fundamental-Frequency Measurement", The Journal of the Acoustical Society of America, Available Online At: https://doi.org/10.1121/1.1910902, vol. 43, No. 4, 1968, pp. 829-834.

Maher et al., "Fundamental frequency estimation of musical signals using a two-way mismatch procedure", The Journal of the Acoustical Society of America, vol. 95, No. 4, Apr. 1994, pp. 2254-2263.

* cited by examiner

AUDIO TRANSPOSITION

CROSS-REFERENCE TO RELATED APPLICATION

The present application is based on PCT filing PCT/EP2021/065967, filed Jun. 14, 2021, which claims priorities to EP 20180336.8, filed on Jun. 16, 2020, the entire contents of each are incorporated herein by reference.

TECHNICAL FIELD

The present disclosure generally pertains to the field of audio processing, and in particular, to devices, methods and computer programs audio transposition.

TECHNICAL BACKGROUND

There is a lot of audio content available, for example, in the form of compact disks (CD), tapes, audio data files which can be downloaded from the internet, but also in the form of soundtracks of videos, e.g. stored on a digital video disk or the like, etc.

When a music player is playing a song of an existing music database, the listener may want to sing along. Naturally, the listener's voice will add to the original artist's voice present in the recording and potentially interfere with it. This may hinder or skew the listener's own interpretation of the song. Therefore, karaoke systems provide a playback of a song in the musical key of the original song recording, for a karaoke singer to sing along with the playback. This can force the karaoke singer to reach a pitch range that is beyond his capabilities, i.e. too high or too low. This may result in a high singing effort for the karaoke singer to reach the pitch range of the original song and therefore the karaoke singer may not be able to stand long singing sessions or could damage his vocal cords. This may also result in the karaoke user having to adapt his pitch to reduce his effort and save his vocal cords and therefore the overall quality of the performance may be bad.

Although there generally exist techniques for audio transposition, it is generally desirable to improve methods and apparatus for transposition of audio content.

SUMMARY

According to a first aspect the disclosure provides an electronic device comprising circuitry configured to separate by audio source separation a first audio input signal into a first vocal signal and an accompaniment, and to transpose an audio output signal by a transposition value based on a pitch ratio, wherein the pitch ratio is based on comparing a first pitch range of the first vocal signal and a second pitch range of a second vocal signal.

According to a second aspect the disclosure provides a method comprising: separating by audio source separation a first audio input signal into a first vocal signal and an accompaniment, and transposing an audio output signal by a transposition value based on a pitch ratio, wherein the pitch ratio is based on comparing a first pitch range of the first vocal signal and a second pitch range of the second vocal signal.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
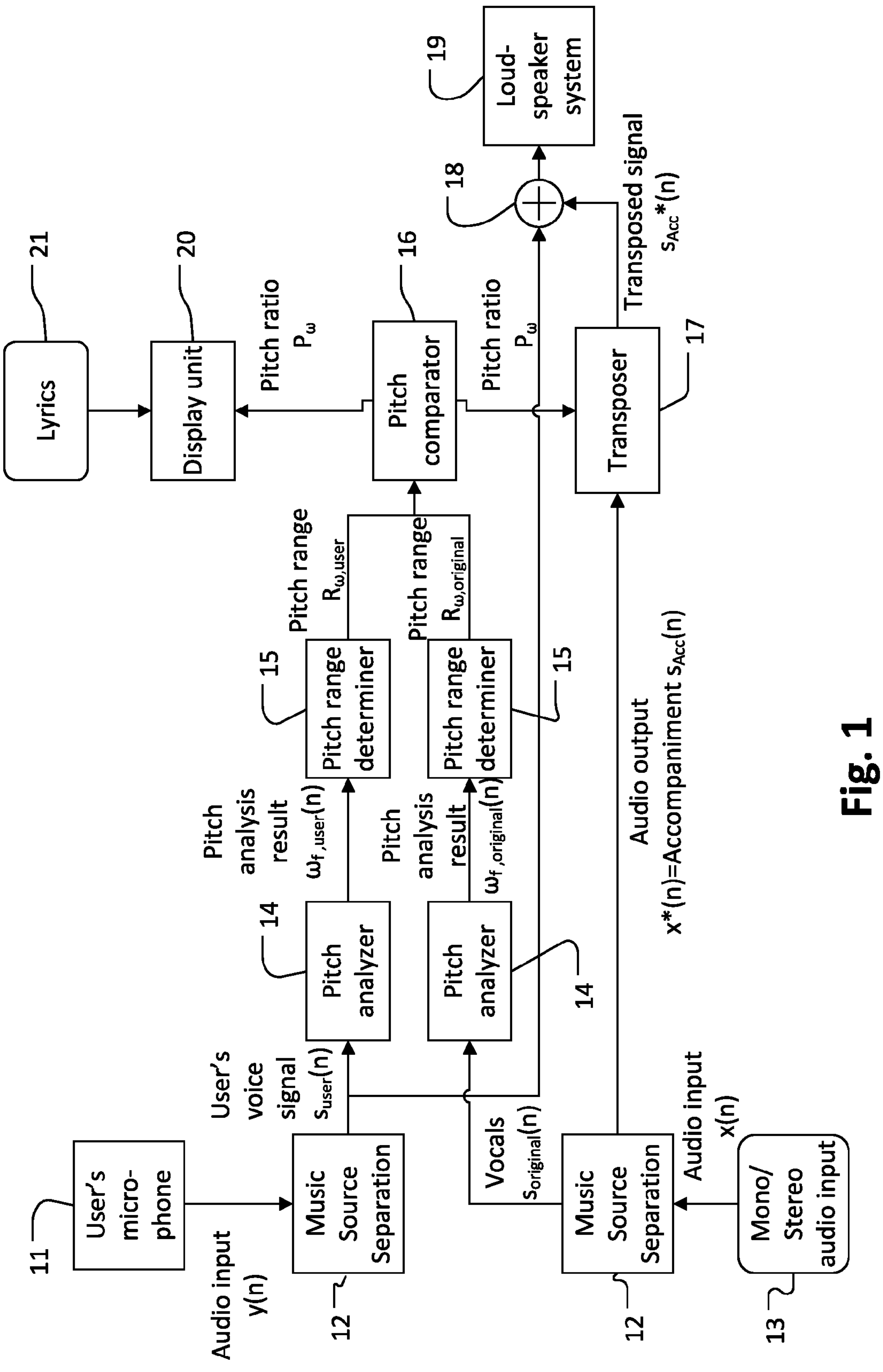
FIG. 1 schematically shows a first embodiment of a process of a karaoke system to automatically transpose an audio signal based on audio source separation and pitch range estimation.

Before a detailed description of the embodiments under reference of FIG. 1 to FIG. some general explanations are made.

The embodiments disclose an electronic device comprising circuitry configured to separate by audio source separation a first audio input signal into a first vocal signal and an accompaniment, and to transpose an audio output signal by a transposition value based on a pitch ratio, wherein the pitch ratio is based on comparing a first pitch range of the first vocal signal and a second pitch range of the second vocal signal.

The electronic device may for example be any music or movie reproduction device such as a karaoke box, a smartphone, a PC, a TV, a synthesizer, mixing console or the like.

The circuitry of the electronic device may include a processor, may for example be CPU, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.

The input signal can be an audio signal of any type. It can be in the form of analog signals, digital signals, it can origin from a compact disk, digital video disk, or the like, it can be a data file, such as a wave file, mp3-file or the like, and the present disclosure is not limited to a specific format of the input audio content. An input audio content may for example be a stereo audio signal having a first channel input audio signal and a second channel input audio signal, without that the present disclosure is limited to input audio contents with two audio channels. In other embodiments, the input audio content may include any number of channels, such as remixing of a 5.1 audio signal or the like.

The input signal may comprise one or more source signals. In particular, the input signal may comprise several audio sources. An audio source can be any entity, which produces sound waves, for example, music instruments, voice, vocals, artificial generated sound, e.g. origin form a synthesizer, etc.

The input audio content may represent or include mixed audio sources, which means that the sound information is not separately available for all audio sources of the input audio content, but that the sound information for different audio sources, e.g. at least partially overlaps or is mixed.

The accompaniment may be a residual signal that results from separating the vocals signal from the audio input signal. For example, the audio input signal may be a piece of music that comprises vocals, guitar, keyboard and drums and the accompaniment signal may be a signal comprising the guitar, the keyboard and the drums as residual after separating the vocals from the audio input signal.

Transposition may be the changing of the pitch of tones of piece of music by a certain interval or shifting an entire piece of music into a different key according to the interval.

A pitch ratio may be a ratio between two pitches. Transposition by a pitch ratio may mean shifting a pitch of tones of piece of music by the ratio between two pitches of or shifting an entire piece of music into a different key according the number of semitones that is defined by the ratio between two pitches.

Blind source separation (BSS), also known as blind signal separation, is the separation of a set of source signals from a set of mixed signals. One application for Blind source separation (BSS), is the separation of music into the individual instrument tracks such that an upmixing or remixing of the original content is possible.

In the following, the terms remixing, upmixing, and downmixing can refer to the overall process of generating output audio content on the basis of separated audio source signals originating from mixed input audio content, while the term "mixing" can refer to the mixing of the separated audio source signals. Hence the "mixing" of the separated audio source signals can result in a "remixing", "upmixing" or "downmixing" of the mixed audio sources of the input audio content.

In audio source separation, an input signal comprising a number of sources (e.g. instruments, voices, or the like) is decomposed into separations. Audio source separation may be unsupervised (called "blind source separation", BSS) or partly supervised. "Blind" means that the blind source separation does not necessarily have information about the original sources. For example, it may not necessarily know how many sources the original signal contained or which sound information of the input signal belong to which original source. The aim of blind source separation is to decompose the original signal separations without knowing the separations before. A blind source separation unit may use any of the blind source separation techniques known to the skilled person. In (blind) source separation, source signals may be searched that are minimally correlated or maximally independent in a probabilistic or information-theoretic sense or on the basis of a non-negative matrix factorization structural constraints on the audio source signals can be found. Methods for performing (blind) source separation are known to the skilled person and are based on, for example, principal components analysis, singular value decomposition, (in)dependent component analysis, non-negative matrix factorization, artificial neural networks, etc.

Although, some embodiments use blind source separation for generating the separated audio source signals, the present disclosure is not limited to embodiments where no further information is used for the separation of the audio source signals, but in some embodiments, further information is used for generation of separated audio source signals. Such further information can be, for example, information about the mixing process, information about the type of audio sources included in the input audio content, information about a spatial position of audio sources included in the input audio content, etc.

The circuitry may be configured to perform the remixing or upmixing based on the at least one filtered separated source and based on other separated sources obtained by the blind source separation to obtain the remixed or upmixed signal. The remixing or upmixing may be configured to perform remixing or upmixing of the separated sources, here "vocals" and "accompaniment" to produce a remixed or upmixed signal, which may be sent to the loudspeaker system. The remixing or upmixing may further be configured to perform lyrics replacement of one or more of the separated sources to produce a remixed or upmixed signal, which may be sent to one or more of the output channels of the loudspeaker system.

According to some embodiment the circuitry may be further configured to determine the first pitch range of the first vocal signal based on a first pitch analysis result of the first vocal signal and the second pitch range of the second vocal signal based on a second pitch analysis result of the second vocal signal.

According to some embodiment wherein the accompaniment comprises all parts of the audio input signal except for the first vocal signal.

According to some embodiment wherein audio output signal may be the accompaniment.

According to some embodiment wherein audio output signal may be the audio input signal.

According to some embodiment wherein the audio output signal may be the mixture of the accompaniment and the first vocal signal.

According to some embodiment wherein may be further configured separate the accompaniment into a plurality of instruments.

According to some embodiment second audio input signal may be separated into the second vocal signal and a remaining signal.

According to some embodiment the circuitry may be further configured to determine a singing effort based on the second vocal signal, wherein the transposition value is based on the singing effort and the pitch ratio.

According to some embodiment the singing effort may be based on the second pitch analysis result of the second vocal signal and the second pitch range of the second vocal signal.

According to some embodiment the circuitry may be further configured to determine the singing effort based on a jitter value and/or a RAP value and/or a shimmer value and/or an APQ value and/or a Noise-to-Harmonic-Ratio and/or a soft phonation index.

According to some embodiment the circuitry may be further configured to transpose the audio output signal based on a pitch ratio, such that transposition value corresponds to an integer multiple of a semitone.

The transposition value may be rounded to ceil or rounded to floor to the next integer multiple of a semitone. Therefore, the accompaniment may be transposed by an integer multiple of a semitone.

According to some embodiment the circuitry may comprises a microphone configured to capture the second vocal signal.

According to some embodiment the circuitry may be further configured to capture the first audio input signal from a real audio recording.

A real audio recording may be any recoding of music that is recorded for example with a microphone compared to a computer-generated sound. A real audio recording may be stored in a suitable audio file like WAV, MP3, AAC, WMA, AIFF etc. That means the audio input may be an actual audio, meaning un-prepared raw audio from for example a commercial performance of a song.

The embodiments disclose a method comprising separating by audio source separation a first audio input signal into a first vocal signal and an accompaniment, and transposing an audio output signal by a transposition value based on a pitch ratio, wherein the pitch ratio is based on comparing a first pitch range of the first vocal signal and a second pitch range of the second vocal signal.

The embodiments disclose a computer program comprising instructions, the instructions when executed on a processor causing the processor to perform the method comprising separating by audio source separation a first audio input signal into a first vocal signal and an accompaniment, and transposing an audio output signal by a transposition value based on a pitch ratio, wherein the pitch ratio is based on comparing a first pitch range of the first vocal signal and a second pitch range of the second vocal signal.

Embodiments are now described by reference to the drawings.

FIG. 1 schematically shows a first embodiment of a process of a karaoke system to automatically transpose an audio signal based on audio source separation and pitch range estimation. An audio input signal x(n), which is received from a mono or stereo audio input 13, contains multiple sources (see 1, 2, . . . , K in FIG. 2) and is input to a process of Music Source Separation 12 and decomposed into separations (see separated source 2 and residual signal 3 in FIG. 2), here into a separated source 2, namely original vocals $s_{original}(n)$, and a residual signal 3, namely accompaniment $s_{Acc}(n)$. An exemplary embodiment of the process of Music Source Separation 2 is described in FIG. 2 below. The audio output signal is x*(n) is equal to the accompaniment $s_{Acc}$ (n) and the audio output signal is x*(n) is transmitted to an transposer 17 and the original vocals $s_{original}$ (n) are transmitted to a signal adder 18 and a pitch analyzer 14 (more detail in FIG. 3) which estimates a pitch analysis result $\omega_{f,original}(n)$ of the original vocals $s_{original}(n)$. The pitch analysis result $\omega_{f,original}(n)$ is input into a pitch range estimator 15 (described in more detail in FIG. 4) which estimates a pitch range $R_{\omega,original}$ of the original vocals $s_{original}$ (n). The pitch range $R_{\omega,original}$ is input into a pitch comparator 16. A User's microphone 11 acquires an audio input signal y(n), which is input int to a process of Music Source Separation 12 and decomposed into separations (see separated source 2 and residual signal 3 in FIG. 2), here into a separated source 2, namely, namely user vocals $s_{user}$ (n), and a residual signal 3 which is not needed in the following. The user vocals $s_{original}$ (n) are transmitted to a pitch analyzer 14 (more detail in FIG. 3) which estimates a pitch analysis result $\omega_{f,user}(n)$ of the user vocals $s_{original}$ (n). The pitch analysis result $\omega_{f,user}$ (n) is input into a pitch range estimator 15 (described in more detail in FIG. 4) which estimates a pitch range $R_{\omega,user}$ of the user vocals $s_{user}$ (n). The pitch range $R_{\omega,user}$ is input into a pitch comparator 16. The pitch range estimator 16 (described in more detail in FIG. 5) receives the pitch range $R_{\omega,original}$ of the original vocals $s_{original}$ (n) and the pitch range $R_{\omega,user}$ of the user vocals $s_{user}$ (n) and outputs a pitch ratio $P_\omega$ between the pitch of an average of pitch range $R_{\omega,original}$ of the original vocals $s_{original}$ (n) and an average of the pitch range $R_{\omega,user}$ of the user vocals $s_{user}(n)$. The pitch ratio $P_\omega$ is input into a transposer 17 (described in more detail in FIG. 6). The transposer 17 receives as inputs a transposition value transpose_val, which is equal to the pitch ratio $P_\omega$ in this case, and the audio output signal is x*(n) (=accompaniment $s_{Acc}(n)$) and transposes the audio output signal is x*(n) (=accompaniment $s_{Acc}(n)$) by the pitch ratio $P_\omega$. The transposer outputs a transposed accompaniment $s_{Acc}(n)$ and inputs it into a signal adder 18. The signal adder 18 receives the transposed accompaniment $s_{Acc}^*(n)$ and the original vocals $s_{original}(n)$ and adds them together and outputs the added signal to a loudspeaker system 19. The pitch ratio $P_\omega$ is further output to a display unit 20 where the value is presented to the user. The display unit 20 further receives lyrics of the user vocals $s_{user}$ (n) and presents them to the user.

In the embodiment of FIG. 1, audio source separation is performed on the audio input signal y(n) in real-time. The audio input signal y(n) is for example a karaoke signal, which comprises the user's vocals and a background sound. The background sound may be any noise that may be captured by the microphone of the karaoke singer, for example the noise of crowd etc. The audio input signal y(n) is processed online through a vocal separation algorithm to extract and potentially remove the user vocals from the background sound. An example for real-time vocal separation is described in published paper Uhlich, Stefan, et al. "Improving music source separation based on deep neural networks through data augmentation and network blending." 2017 IEEE International Conference on Acoustics, Speech and Signal Processing (ICASSP). IEEE, 2017, wherein the bi-directional LSTM layers are replaced by uni-directional ones.

The audio source separation is performed on the audio input signal x(n) in real-time. The audio input signal x(n) is for example a song on which the karaoke singing should be performed, which comprises the original vocals and the accompaniment. The audio input signal x(n) may processed online through a vocal separation algorithm to extract and potentially remove the user vocals from the playback sound or the audio input signal x(n) may be processed in advance when the audio input signal x(n) is for example stored in a music library. In case of in-advance-processing the pitch analysis and the pitch range estimation may also be performed in advance. In order to do in-advance-processing each of the songs in a karaoke song database needs to be analyzed for pitch range.

There exist karaoke boxes that where a manual transposition is possible. However, most karaoke singers (also called karaoke users) do not know whether the pitch range is adequate to their capabilities and therefore an automatic on-line transposition of the accompaniment $s_{Acc}(n)$ has a great advantage.

In one embodiment the audio input x(n) is a MIDI file (see more details in description of FIG. 7 below). In this case the karaoke system transposes the accompaniment $s_{Acc}(n)$ each of the MIDI tracks by a MIDI synthesizer.

In another embodiment the audio input x(n) is an audio recording, for example a WAV file, a MP3 file, AAC file, a WMA file, AIFF file etc. That means the audio input x(n) is an actual audio, meaning un-prepared raw audio from for example a commercial performance of a song. The karaoke material does not require any manual preparation, and can be processed totally automatically, on-line and be provided good quality and high realism, so in this embodiment no pre-prepared audio/MIDI material is needed.

To analyze pitch-range and singing effort (see FIG. 8) of the karaoke singer, the karaoke system uses a vocal/instrument separation algorithm (see FIG. 2) to obtain a clean vocal recording from the microphone of the karaoke singer or the original song (sung by the original singer).

Although the pitch analysis unit and the transposer unit are functionally separated in FIG. 1 they are both carried out automatically in both stages are combined such that minimal transposition factors and deviation from the original recording are achieved while minimizing singer fatigue and effort. The system essentially optimizes the performance experience for both singers and listeners of the karaoke session.

Figure 2:
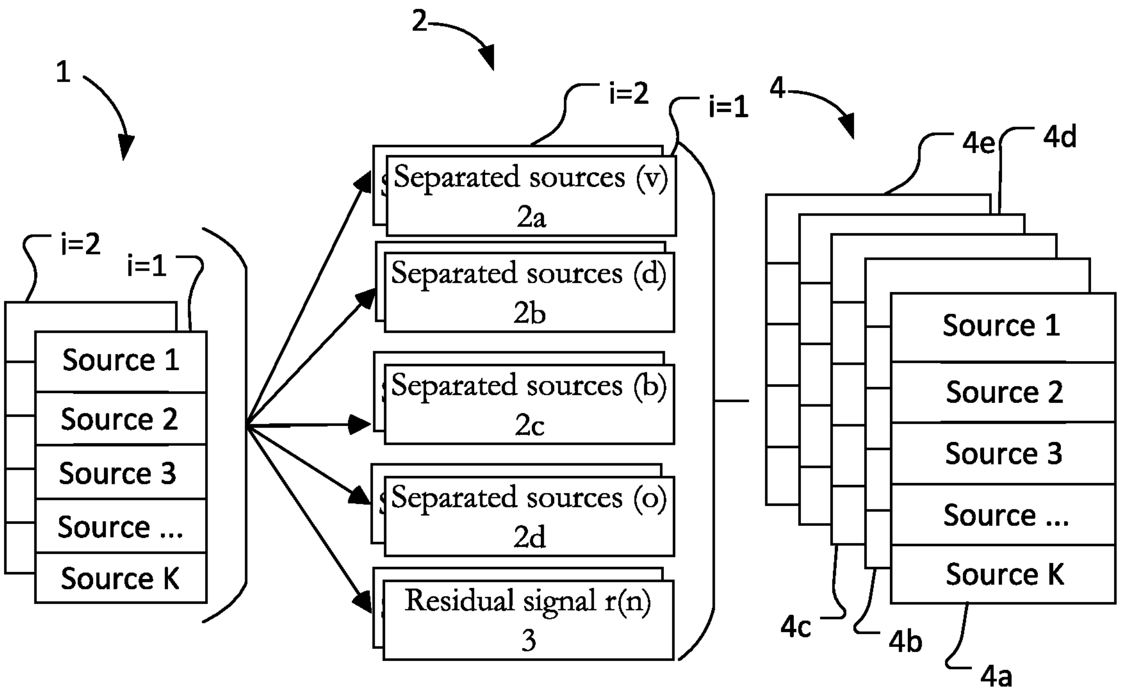
FIG. 2 schematically shows a general approach of audio upmixing/remixing by means of blind source separation (BSS), such as music source separation (MSS)

Further, advantages of the karaoke system described above are that the low-delay processing of vocal/instrument separation allows for an online pitch analysis and transposition. Further, the vocal separation allows for accurate analysis of vocal pitch range and determination of the singing effort. Further, the vocal/instrument separation processes real audio does the karaoke not limited to MIDI karaoke songs and therefore the music is much more realistic. Still further, the vocal/instrument separation enables improved transposition quality of real audio recordings Audio Remixing/Upmixing by Means of Audio Source Separation FIG. 2 schematically shows a general approach of audio upmixing/remixing by means of blind source separation (BSS), such as music source separation (MSS). First, audio source separation (also called "demixing") is performed which decomposes a source audio signal 1, here audio input signal x(n), comprising multiple channels I and audio from multiple audio sources Source 1, Source 2, . . . , Source K (e.g. instruments, voice, etc.) into "separations", here separated source 2, e.g. vocals $s_O(n)$, and a residual signal 3, e.g. accompaniment $s_A(n)$, for each channel i, wherein K is an integer number and denotes the number of audio sources. The residual signal here is the signal obtained after separating the vocals from the audio input signal. That is, the residual signal is the "rest" audio signal after removing the vocals for the input audio signal. In the embodiment here, the source audio signal 1 is a stereo signal having two channels i=1 and i=2. Subsequently, the separated source 2 and the residual signal 3 are remixed and rendered to a new loudspeaker signal 4, here a signal comprising five channels 4*a*-4*e*, namely a 5.0 channel system. The audio source separation process (see 104 in FIG. 1) may for example be implemented as described in more detail in published paper Uhlich, Stefan, et al. "Improving music source separation based on deep neural networks through data augmentation and network blending." 2017 IEEE International Conference on Acoustics, Speech and Signal Processing (ICASSP). IEEE, 2017.

As the separation of the audio source signal may be imperfect, for example, due to the mixing of the audio sources, a residual signal 3 (r(n)) is generated in addition to the separated audio source signals 2*a*-2*d*. The residual signal may for example represent a difference between the input audio content and the sum of all separated audio source signals. The audio signal emitted by each audio source is represented in the input audio content 1 by its respective recorded sound waves. For input audio content having more than one audio channel, such as stereo or surround sound input audio content, also a spatial information for the audio sources is typically included or represented by the input audio content, e.g. by the proportion of the audio source signal included in the different audio channels. The separation of the input audio content 1 into separated audio source signals 2*a*-2*d* and a residual 3 is performed on the basis of blind source separation or other techniques which are able to separate audio sources.

In a second step, the separations 2*a*-2*d* and the possible residual 3 are remixed and rendered to a new loudspeaker signal 4, here a signal comprising five channels 4*a*-4*e*, namely a 5.0 channel system. On the basis of the separated audio source signals and the residual signal, an output audio content is generated by mixing the separated audio source signals and the residual signal on the basis of spatial information. The output audio content is exemplary illustrated and denoted with reference number 4 in FIG. 2.

In a second step, the separations and the possible residual are remixed and rendered to a new loudspeaker signal 4, here a signal comprising five channels 4*a*-4*e*, namely a 5.0 channel system. On the basis of the separated audio source signals and the residual signal, an output audio content is generated by mixing the separated audio source signals and the residual signal on the basis of spatial information. The output audio content is exemplary illustrated and denoted with reference number 4 in FIG. 2.

The audio input x(n) and audio input y(n) can be separated by the method described on FIG. 2, wherein the audio input y(n) is separated into the user vocals $s_{user}$ (n) and a non-used background sound and the and audio input x(n) is separated into the original vocals $s_{user}$ (n) and the accompaniment $s_{acc}(n)$. The accompaniment $s_{acc}$ (n) be further separated into the respective tracks, for example drums, piano, strings etc. (see FIG. 11). The separation of the vocal allows large improvements in the way both accompaniment and vocals are processed.

Another method to the removed the accompaniment from the audio input y(n) is for example a crosstalk cancellation method, where a reference of the accompaniment is subtracted in-phase from the microphone signal, for example by using adaptive filtering.

Another method to separate the audio input y(n) can be utilized if a mastering recording for the audio input y(n) is available in-detail knowledge about how audio input y(n) (i.e. a song) was mastered. In this case the stems need to be mixed again without the vocals and the vocals need to be mixed again without all the accompaniment. In this process a much larger number of stems is used during mastering, e.g. layered vocals, multi-microphone takes, effects being applied, etc.

Pitch Analysis

Figure 3:
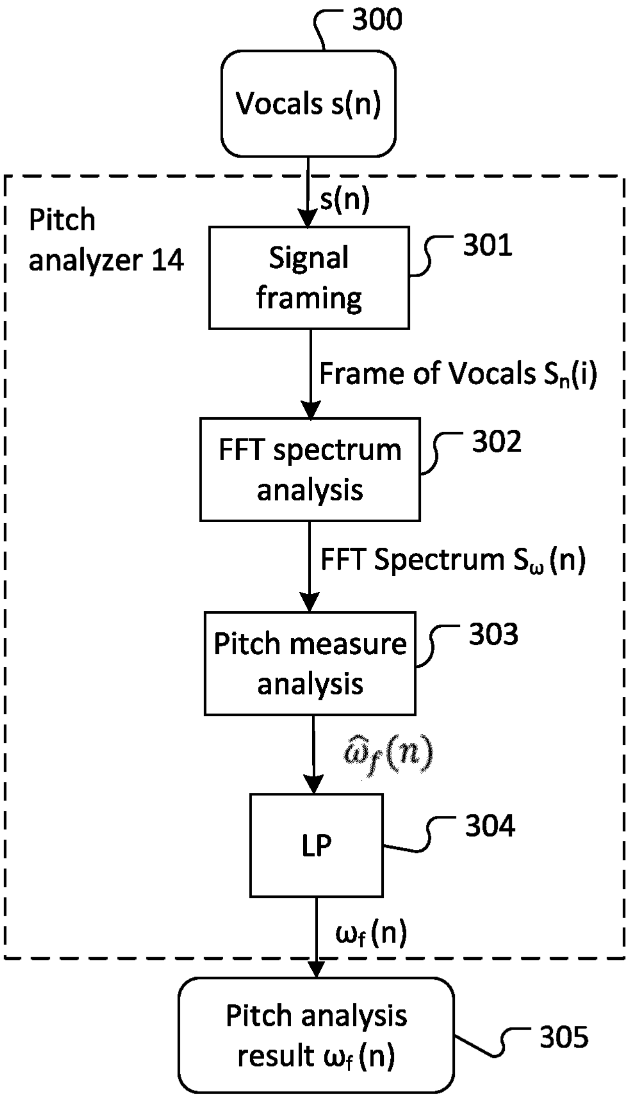
FIG. 3 shows in more detail an embodiment of a process of pitch analysis performed in the pitch analyzer in FIG. 1.

FIG. 3 shows in more detail an embodiment of a process of pitch analysis performed in the pitch analyzer 13 in FIG. 1. As described in FIG. 1, a pitch analysis is performed on the original vocals $s_{original}$ (n) and on the user vocals $s_{original}((n)$, respectively, to obtain a pitch analysis result $\omega_f(n)$. In particular, a process of signal framing 301 is performed on vocals 300, namely on a vocals signal s(n), to obtain Framed Vocals $S_n(i)$. A process of Fast Fourier Transform (FFT) spectrum analysis 302 is performed on the framed vocals $S_n(i)$ to obtain the FFT spectrum $S_\omega(n)$. A pitch measure analysis 303 is performed on the FFT spectrum $S_\omega(n)$ to obtain a pitch measure result $R_P(\omega_f)$.

At the signal framing 301, a windowed frame, such as the framed vocals $S_n(i)$ can be obtained by $$S_n(i)=s(n+i)h(i)$$

where s(n+i) represents the discretized audio signal (i representing the sample number and thus time) shifted by n samples, h(i) is a framing function around time n (respectively sample n), like for example the hamming function, which is well-known to the skilled person.

At the FFT spectrum analysis 302, each framed vocals is converted into a respective short-term power spectrum. The short-term power spectrum S(ω) as obtained at the Discrete Fourier transform, also known as power spectral density, which may be obtained by $$|S_\omega(n)| = \left| \sum_{i=0}^{N-1} S_n(i) e^{-\frac{j2\pi\omega i}{N}} \right|$$

where $S_n(i)$ is the signal in the windowed frame, such as the framed vocals $S_n(i)$ as defined above, ω are the frequencies in the frequency domain, $|S_\omega(n)|$ are the components of the short-term power spectrum S(o) and N is the numbers of samples in a windowed frame, e.g. in each framed Vocals.

The pitch measure analysis 303 may for example be implemented as described in the published paper Der-Jenq Liu and Chin-Teng Lin, "Fundamental frequency estimation based on the joint time-frequency analysis of harmonic spectral structure" in IEEE Transactions on Speech and Audio Processing, vol. 9, no. 6, pp. 609-621, September 2001:

A pitch measure $R_P(\omega_f)$ is obtained for each fundamental-frequency candidate (Of from the power spectral density $S_\omega(n)$ of the frame window $S_n$ by $$R_P(\omega_f)=R_E(\omega_f)R_I(\omega_f)$$

where $R_E(\omega_f)$ is the energy measure of a fundamental-frequency candidate $\omega_f$, and $R_I(\omega_f)$ is the impulse measure of a fundamental-frequency candidate $\omega_f$.

The energy measure $R_E(\omega_f)$ of a fundamental-frequency candidate $\omega_f$ is given by $$R_E(\omega_f) = \frac{\sum_{l=1}^{K(\omega_f)} h_{in}(l\omega_f)}{E}$$

where $K(\omega_f)$ is the number of the harmonics of the fundamental frequency candidate $\omega_f$, $h_{in}(n\omega_f)$ is the inner energy related to a harmonic $l\omega_f$ of the fundamental frequency candidate $\omega_f$, and E is the total energy, where $E=\int_0^\infty S_\omega(n)d\omega$.

The Inner Energy $$h_{in}(\omega_f) = \int_{\omega_{f-w_{in}/2}}^{\omega_{f+w_{in}/2}} S_\omega(n)d\omega$$

is the area under the curve of spectrum bounded by an inner window of length $w_{in}$ and the total energy is the total area under the curve of the spectrum.

The impulse measure $R_I(\omega_f)$ of a fundamental-frequency candidate $\omega_f$ is given by $$R_I(\omega_f) = \frac{\sum_{l=1}^{K(\omega_f)} h_{in}(l\omega_f)}{\sum_{l=1}^{K(\omega_f)} h_{out}(l\omega_f)}$$

where $\omega_f$ is the fundamental frequency candidate, $K(\omega_f)$ is the number of the harmonics of the fundamental frequency candidate $\omega_f$, $h_{in}(l\omega_f)$ is the inner energy of the fundamental frequency candidate, related to a harmonic $n\omega_f$ and $h_{out}(l\omega_f)$ is the outer energy, related to the harmonic $l\omega_f$.

The Outer Energy $$h_{out}(n\omega_f) = \int_{\omega_{f-w_{out}/2}}^{\omega_{f+w_{out}/2}} S_\omega(n)d\omega$$

is the area under the curve of spectrum bounded by an outer window of length $w_{out}$.

The pitch analysis result $\hat{\omega}_f(n)$ for frame window $S_n$ is obtained by $$\hat{\omega}_f(n)=\arg\max_{\omega_f} R_P(\omega_f)$$

where $\hat{\omega}_f(n)$ is the fundamental frequency for window S(n), and $R_P(\omega_f)$ is the pitch measure for fundamental frequency candidate $\omega_f$ obtained by the pitch measure analysis 303, as described above.

The fundamental frequency $\hat{\omega}_f(n)$ at sample n is the pitch measurement result that indicates the pitch of the vocals at sample n in the vocals signal s(n).

Still further, a low pass filter (LP) 304 is performed on the pitch measurement result $\hat{\omega}_f(n)$ to obtain a pitch analysis result $\omega_f(n)$ 305.

The low pass filter 305 can be a causal discrete-time low-pass Finite Impulse Response (FIR) filter of order M given by $$\omega_f(n) = \sum_{i=0}^{M} a_i \hat{\omega}_f(n-i)$$

where $a_i$ is the value of the impulse response at the $i^{th}$ instant for $0 \le i \le M$. In this causal discrete-time FIR filter $e_p(n)$ of order M, each value of the output sequence is a weighted sum of the most recent input values.

The filter parameters M and $a_i$ can be selected according to a design choice of the skilled person. For example, $a_0=1$ for normalization purposes. The parameter M can for example be chosen on a time scale up to 1 sec.

A pitch analysis process as described with regard to FIG. 3 above is performed on the original vocals $s_{original}(n)$ to obtain the original vocals pitch analysis result $\omega_{f,original}(n)$ and on the user vocals $s_{original}(n)$ to obtain the user's pitch analysis result $\omega_{f,user}$ (n).

In the embodiment of FIG. 3, it is proposed to perform pitch measure analysis, such as the Pitch measure Analysis 303, for estimating the fundamental frequency $\omega_f$, based on FFT-spectrum. Alternatively, the fundamental frequency (of may be estimated based on a Fast Adaptive Representation (FAR) spectrum algorithm.

Other methods for pitch analysis and estimation for monophonic signals which can be used instead or additional to method described in FIG. 3 are described in the following scientific papers: A multiplicative autocorrelation method is described in "New methods of pitch extraction," by Sondhi, M. M, published in EEE Trans. Audio Electroacoust. AU-16, 262-266, in 1968. An average magnitude difference function method is described in "Average magnitude difference function pitch extractor" by Ross, M. J., Shaffer, H. L., Cohen, A., Freudberg, R., and ManIcy, H. J, published in IEEE Trans. Acoust. Speech Signal Process. ASSP-22, 353-362, in 1974. A comb filtering method is described in "The optimum comb method of pitch period analysis of continuous digitized speech" by Moorer, J. A., published in IEEE Trans. Acoust. Speech Signal Process. ASSP-22, 330-338, in 1974. A linear prediction analysis based method is described in "Linear Prediction of Speech", by Moorer, J. A, published in Springer-Verlag, New York, in 1974. A cepstrum based method is described in "Cepstrum pitch determination", by Noll, A. M., published in J. Acoust. Soc. Am. 41, 293-309, in 1966. A period histogram method is described in "Period histogram and product spectrare: New methods for fundamental frequency measurement," by Schroeder, M. R., published in J. Acoust. Soc. Am. 43, 829-834, in 1968.

Still further, other more advanced methods for pitch analysis and estimation which can be used instead or additional to method described in FIG. 3 is described in the scientific paper "Fundamental frequency estimation of musical signals using a two-way mismatch procedure", by R. C. Maher, J. W. Beauchamp, published in the Journal of the Acoustical Society of America 95(4), in April 1994.

For a robust pitch determination, it is needed to use a pitch tracking (avoid pitch doubling errors and voiced/unvoiced detection), which is often done by using a dynamic programming on a pitch FO candidates, as described in any of the methods given above. A pitch tracking method is described in "An integrated pitch tracking algorithm for speech systems", B. Secrest and G. Doddington, published in ICASSP '83. IEEE International Conference on Acoustics, Speech, and Signal Processing, Boston, Massachusetts, USA, 1983, pp. 1352-1355, doi: 10.1109/ICASSP.1983.1172016.

Still further, the pitch analysis and the (key) transposition is better if vocals and the accompaniment are separate.

Pitch Range Determination

Figure 4:
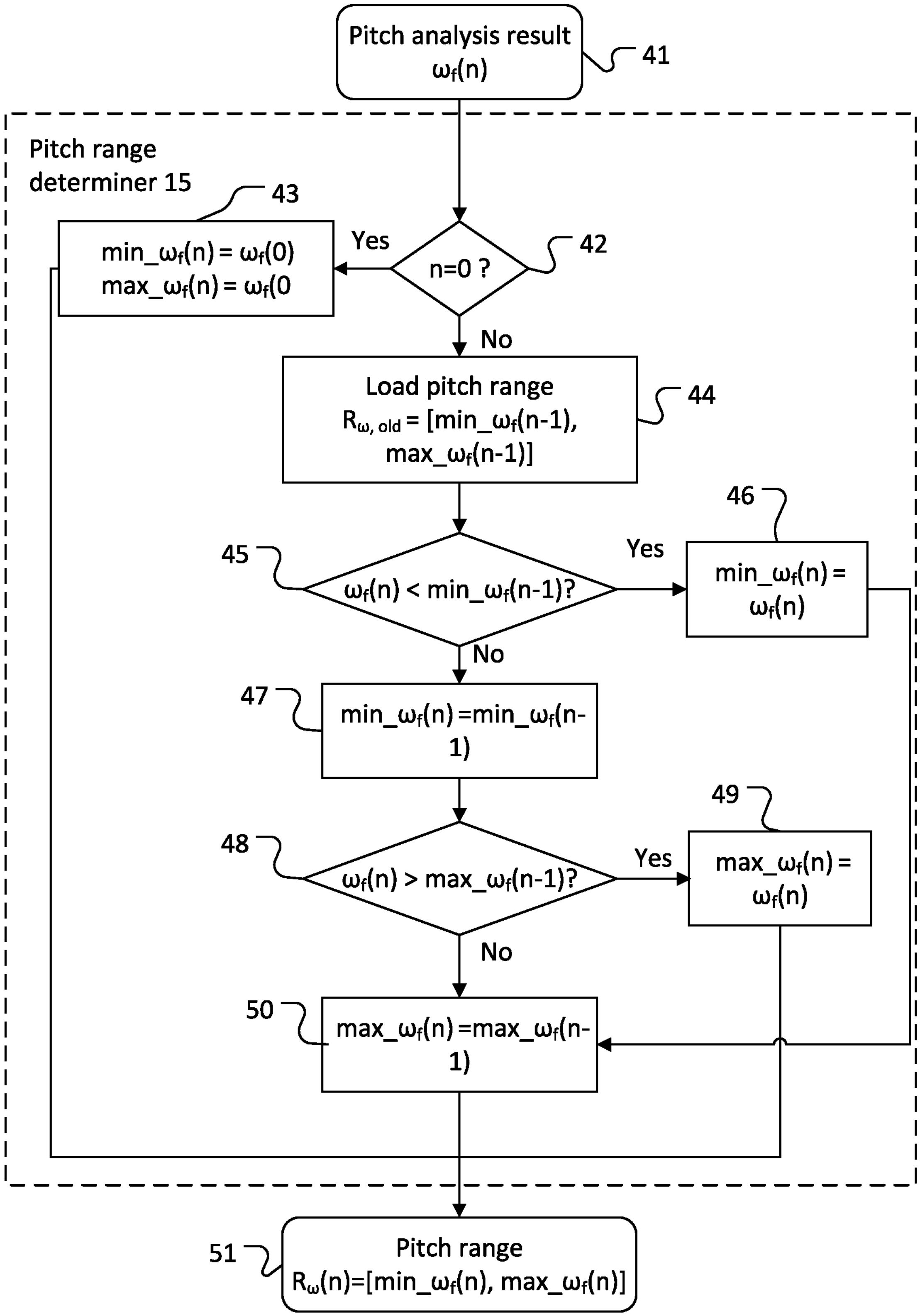
FIG. 4 schematically shows a flow chart describing the process of the pitch range determiner of FIG. 1.

FIG. 4 schematically shows a flow chart describing the process of the pitch range determiner 15 of FIG. 1. In step 41, a pitch analysis result $\omega_f(n)$ is received as input into the pitch range determiner 15. In step 42, it is tested whether the sample number n is zero. If the query from step 41 was answered with yes, the process continues with step 43. In step 43, a lower limit min $\_\omega_f(n)$ of a pitch range $R_\omega(n)=[min\_\omega_f(n), max\_\omega_f(n)]$ is initialized with min $\_\omega_f(0)=\omega_f(0)$, and a upper limit $max\_\omega_f(n)$ of a pitch range $R_\omega(n)=[min\_\omega_f((n), max\_\omega_f(n)]$ is initialized with max $\_\omega_f(0)=\omega_f(0)$. After step 43, the process continues with step 51. In step 51 the pitch range $R_\omega=[min\_\omega_f(n), max\_\omega_f(n)]$ is output as a result of the pitch range determiner 15 and stored in a storage, for example the storage memory 1202. If the query from step 41 was answered with no the process continues with step 44. In step 44, an old pitch range $R_{\omega,old}=[min\_\omega_f(n-1), max\_\omega_f(n-1)]$ is loaded from the storage. In step 45, it is tested whether the pitch analysis result $(\omega_f(n)$ is smaller than the a lower limit min $\_\omega_f(n-1)$ of the old pitch range $R_\omega(n)=[min\_\omega_f(n-1), max\_\omega_f(n-1)]$. If the query from step 45 was answered with yes, the process continues with step 46. In step 46 the lower limit min $\_\omega_f(n)$ of the pitch range $R_\omega(n)=[min\_\omega_f(n), max\_\omega_f(n)]$ is set to $min\_\omega_f(n)=\omega_f(n)$ and the process continuous with step 50. In step 50, the upper limit min $\_\omega_f(n)$ of the pitch range $R_\omega(n)=[min\_\omega_f(n), max\_\omega_f(n)]$ is set to max $\_\omega_f(n)=max\ \_\omega_f(n-1)$ and the process continuous with step 51. In step the In step 51 the pitch range $R_\omega(n)=[min\_\omega_f(n), max\_\omega_f((n)]$ is output as a result of the pitch range determiner 15 and stored in a storage, for example the storage memory 1202. If the query from step 45 was answered with no, the process continues with step 47. In step 47 the lower limit max $\_\omega_f(n)$ of the pitch range $R_\omega(n)=[min\_\omega_f(n), max\_\omega_f(n)]$ is set to min $\_\omega_f(n)=min\_\omega_f(n-1)$ and the process continuous with step 48. In step 48, it is tested whether the pitch analysis result $\omega_f(n)$ is greater than the a upper limit max $\_\omega_f(n-1)$ of the old pitch range $R_\omega=[min\_\omega_f(n-1), max\_\omega_f(n-1)]$. If the query from step 48 was answered with yes, the process continues with step 49. In step 49, the upper limit max $\_\omega_f(n)$ of the pitch range $R_\omega=[min\ \_\omega_f(n), max\_\omega_f(n)]$ is set to $max\_\omega_f(n)=\omega_f(n)$ and the process continuous with step 51. In step the In step 51 the pitch range $R_\omega(n)=[min\_\omega_f(n), max\_\omega_f(n)]$ is output as a result of the pitch range determiner 15 and stored in a storage, for example the storage memory 1202. If the query from step 48 was answered with no, the process continues with step 50. In step 50, the upper limit $max\_\omega_f(n)$ of the pitch range $R_\omega(n)=[min\_\omega_f(n), max\_\omega_f(n)]$ is set to $max\_\omega_f(n)=max\_\omega_f(n-1)$ and the process continuous with step 51. In step the In step 51 the pitch range $R_\omega(n)=[min\_\omega_f(n), max\_\omega_f(n)]$ is output as a result of the pitch range determiner 15 and stored in a storage, for example the storage memory 1202.

The pitch range determination process as described above can be carried out based on the original vocals $s_{original}(n)$ pitch analysis result $\omega_{f,original}(n)$ and on the user vocals $s_{user}(n)$ pitch analysis result $\omega_{f,user}(n)$.

The pitch determination process of the pitch determiner as described above in FIG. 4 can be carried out on-line which means that for each sample (or frame) from the audio input y(n), for example a karaoke performance of an user, a pitch analyzing process 14 and a pitch range determination process 15 is carried out.

In another embodiment the pitch range determination process of the pitch determiner 15 as described above may be carried out on in-advance stored audio input x(n) that is for example a stored song of a karaoke system whose pitch range should be determined. In this case the upper limit max $\_\omega_f(n)$ of the pitch range $R_\omega(n)=[min\_\omega_f(n), max\_\omega_f(n)]$ is determined by setting $$max\_\omega_f(n) = \max_{n=1\ \dots\ N} \omega_f(n),$$

wherein max is the maximum-function and N is the number of all samples if the stored audio input x(n) and the lower limit $min\_\omega_f(n)$ of the pitch range $R_\omega(n)=[min\_\omega_f(n), max\_\omega_f(n)]$ is determined by setting $$min\_\omega_f(n) = \min_{n=1\ \dots\ N} \omega_f(n),$$

wherein min is the minimum-function

In yet another embodiment the pitch range determination process of the pitch determiner 15 as described above may be carried out on in-advance stored audio input y(n), that is for example a stored karaoke performance of a user on a number of previous songs from which a pitch range and singing effort (see below) profile can be compiled. In this case the pitch range $R_\omega(n)=[min\_\omega_f(n), max\_\omega_f(n)]$ can be determined as described in the previous paragraph.

Figure 5:
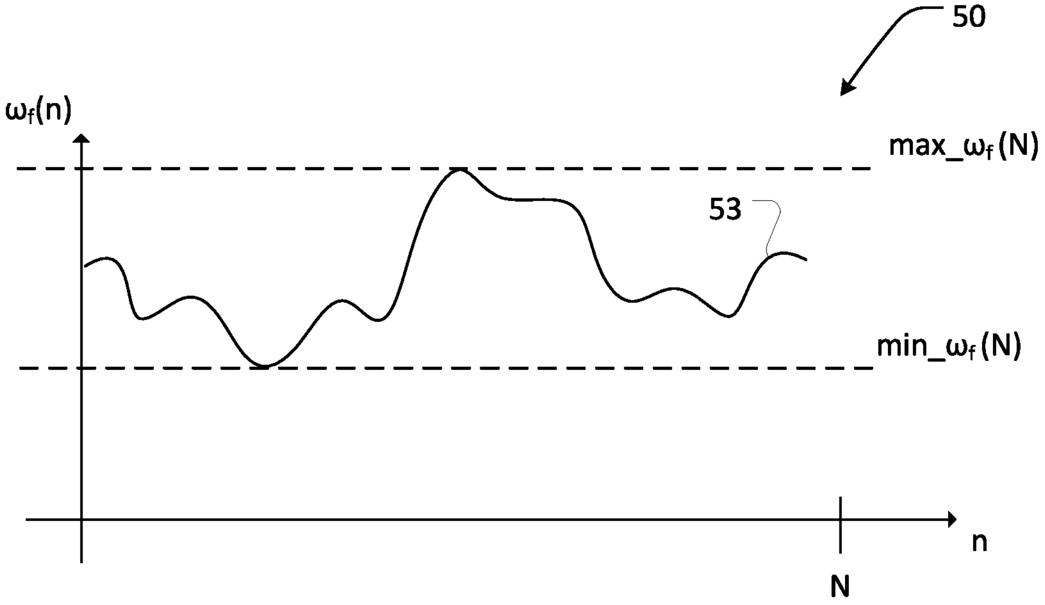
FIG. 5 schematically shows a graph of pitch analysis result.

FIG. 5 schematically shows a graph of pitch analysis result. On an x-axis of a diagram 50 a number of samples n of an audio input t y(n) or t x(n) is shown, wherein the total number of samples is N. On a y-axis of the diagram 50 the pitch range analysis result $\omega_f(n)$ is shown. A graph 53 indicates the pitch range analysis result of (n) over the sample number n. The lower limit min $\_\omega_f(n)$ of the pitch range $R_\omega(n)=[min\_\omega_f(n), max\_\omega_f(n)]$ over all N samples is given by the value min $\_\omega_f(N)$ which is lowest value that the graph 53 reaches over all N. The upper limit max $\_\omega_f(n)$ of the pitch range $R_\omega(n)=[min\_\omega_f(n), max\_\omega_f(n)]$ over all N samples is given by the value max $\_\omega_f(N)$ which is highest value that the graph 53 reaches over all N.

Figure 6:
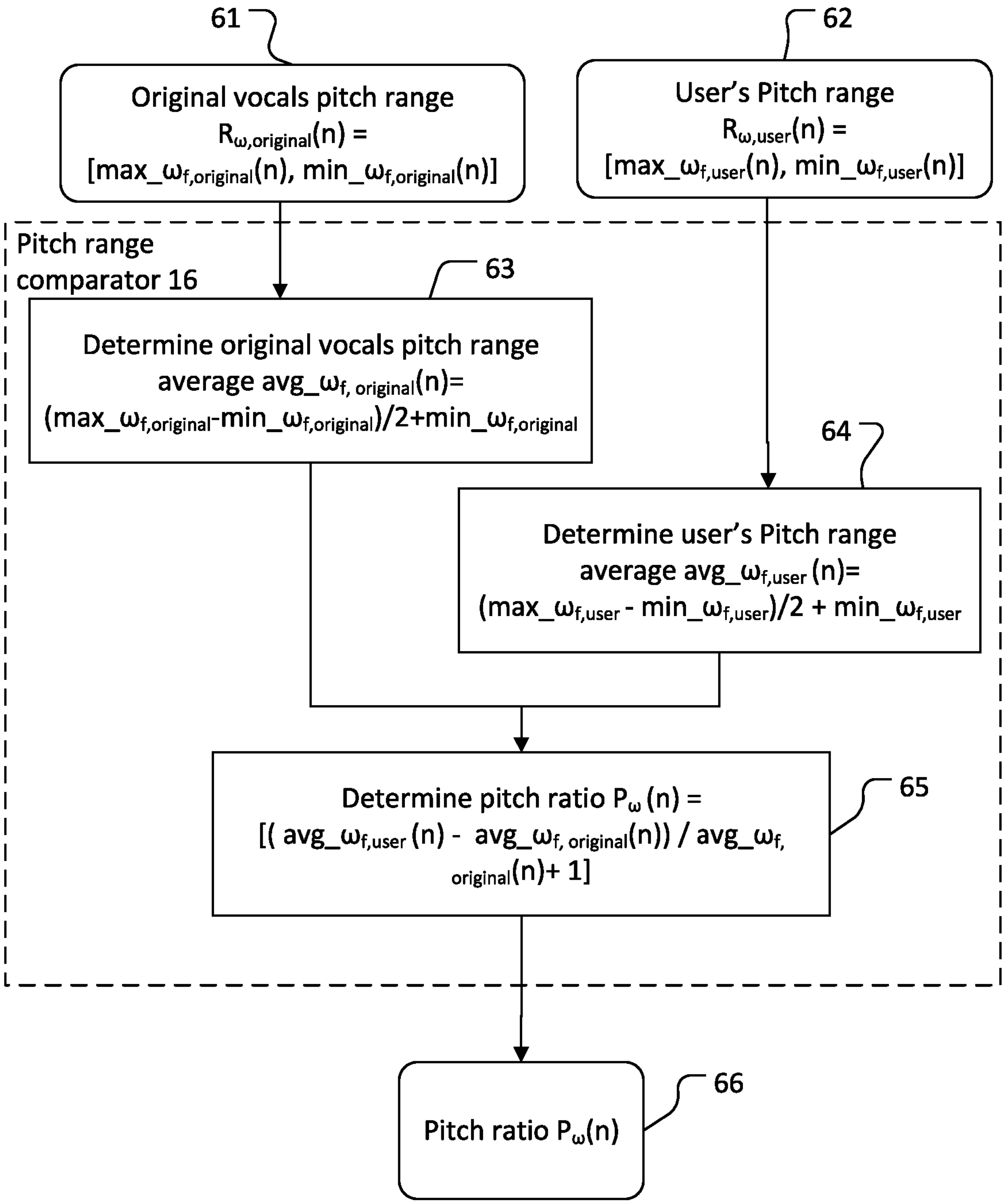
FIG. 6 schematically shows a flow chart describing the process of the pitch range comparator of FIG. 1.

Pitch Range Comparison FIG. 6 schematically shows a flow chart describing the process of the pitch range comparator 16 of FIG. 1. In step 61, the pitch range $R_{\omega,original}(n)=[min\_\omega_f(n), max\_\omega_f(n)]$ (also called a first pitch range) of the original vocals $s_{original}(n)$ (also called first vocal signal) is received as input into step 63. In step 62, the pitch range $R_{\omega,user}(n)=[min\_\omega_f(n), max\_\omega_f(n)]$ (also called a second pitch range) of the user's vocals $s_{user}(n)$ (also called a second vocal signal) is received as input into step 64. In step 63, an original vocal pitch range average $avg\_\omega_{f,original}$ is determined as $avg_{\omega_{f,original}}(n)=[max\_\omega_{f,original}(n)-min\_\omega_{f,original}(n)]/2+min\_\omega_{f,original}(n)$. In step 64, an users's vocal pitch range average $avg\_\omega_{f,user}(n)$ is determined as $avg\_\omega_{f,user}(n)=[max\_\omega_{f,user}(n)-min\_\omega_{f,user}(n)]/2+min\_\omega_{f,user}(n)$. In step 65 a pitch ratio $P_\omega(n)$ is determined as $P_\omega(n)=[(avg_{\omega_{f,user}}(n)-avg_{\omega_{f,original}}(n))/avg\_\omega_{f,original}(n)+1]$. In step 66, the pitch ratio $P_\omega(n)$ is output as result of the pitch range comparison process of the pitch range comparator 16.

The pitch range comparison process of the pitch range comparator 16 as described above is carried out for every sample n of the user's vocals $s_{user}(n)$. That means, while a user may perform a karaoke, the pitch ratio $P_\omega(n)$ can be adapted at every sample n. The final pitch ratio $P_\omega(N)$ over all samples n=1 . . . N after finishing a karaoke performance by a user can be stored in a database, for example the storage 1202, and be linked to the user.

The pitch ratio $P_\omega(n)$ is a value relative to original vocal pitch range average $avg\_\omega_{f,original}(n)$ and centered around the 1, so that it can be seen as a kind of a "transposition factor" which should be applied to the that original vocal pitch frequency $\omega_{f,original}(n)$.

As described above, as well as the pitch analysis result of $\omega_\omega(n)$ from the pitch analyzer 14 and the pitch range $R_\omega(n)$ from the pitch range determiner 15 the pitch ratio $P_\omega(n)$ can be determined online for every sample n from an audio input y(n), for example from a live karaoke performance of a user, and from an audio input x(n), for example from a chosen song to which to a karaoke performance should be performed.

If a pitch range $R_{\omega,user}$ (N) of an user is known in advance (i.e. before the karaoke on a song is performed which yields an audio input y(n)), for example from another song that was performed by the user and is stored in the storage 1202, the pitch ratio $P_\omega(N)$ may be determined based on the in advance known range of the user $R_{\omega,user}$ and a in advance known range of the user $R_{\omega,original}(N)$.

In the realm of music and musical transposition it is often stated how much semitones or full tones a piece of music is transposed. Since an octave comprises 12 semitones and octave corresponds to pitch ratio $P_\omega(n)=2$ the transposition up by a semitone corresponds to a pitch ratio $P_\omega(n)=2^{1/12}=1.087$ the transposition down by a semitone corresponds to pitch ratio $P_\omega(n)=(\frac{1}{2})^{1/12}=0.920$. In this way, the pitch ratio $P_\omega(n)$ and a semitone transposition specification can be easily converted into each other. Therefore, another embodiment the pitch ratio $P_\omega(n)$ may be rounded to ceil or to floor (i.e. up or down) to the next semitone such that pitch ratio $P_\omega(n)$ always corresponds to a transposition by a integer multiple of an semitone.

Transposition

As described above the goal is, during a karaoke performance of an user to a song, to transpose the accompaniment $s_{Acc}(n)$ of the song such that the user can more easily match his voice to the accompaniment $s_{Acc}(n)$. The "transposition factor" by which the accompaniment $s_{Acc}(n)$ should be transposed is determined as described in FIG. 6 above. Transposition of an audio input can for example be done by a standard pitch-scale modification technique, where all frequencies are be multiplied by a predetermined value, in our case by the transposition value transpose_val(n). The standard pitch-scale modification technique comprises a step of time-scale modification and a step of resampling.

Figure 7:
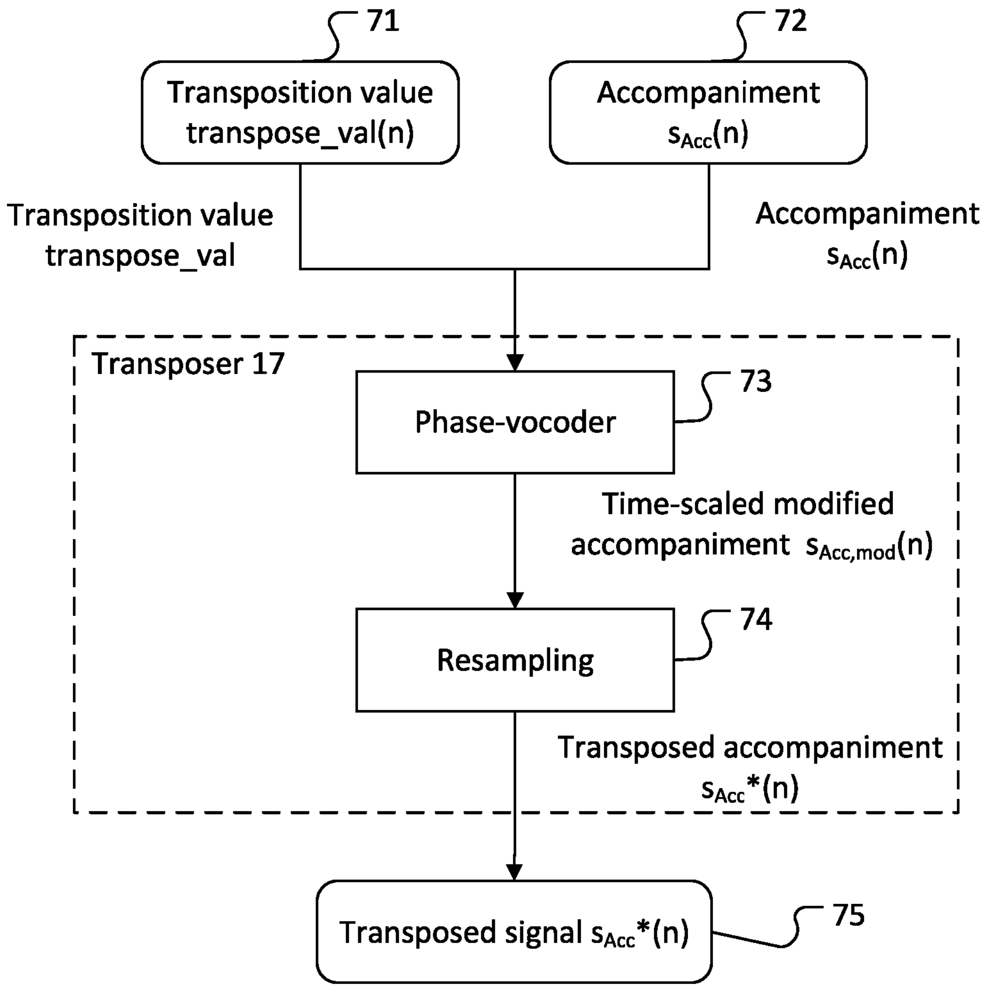
FIG. 7 schematically shows a flow chart describing the process of the transposer of FIG. 1.

FIG. 7 schematically shows a flow chart describing the process of the transposer 17 of FIG. 1. In step 71, a transposition value transpose_val is received. In this embodiment the transposition value transpose_val(n) is set equal to the pitch ratio $P_{\omega,user}(n)$, i.e. $transpose_{val(n)}=P_{\omega,user}(n)$. In step 72 the accompaniment $s_{Acc}$ (n) is received as input. In step 73 a time-scale modification of the accompaniment $s_{Acc}(n)$ is with the transposition value the transpose_val(n) as time factor. The time-scale modification of the accompaniment $s_{Acc}(n)$ is done with a phase-vocoder. A phase vocoder expands or shortens accompaniment $s_{Acc}(n)$ by the factor of the transposition value transpose_val without altering the frequencies of the accompaniment $s_{Acc}(n)$. This yields a time-scaled modified accompaniment $s_{Acc,mod}(n)$ as an output of step 73 and as input into step 74. In step 74, the time-scaled modified accompaniment $s_{Acc,mod}(n)$ is resampled with a new sampling period ΔT*transpose_val(n), wherein the ΔT is sampling period which was used when sampling the accompaniment $s_{Acc}(n)$. That means during the resampling the with the new sampling period ΔT*transpose_val(n) the time-scaled modified accompaniment $s_{Acc}$,mod(n) has been shortened or expanded to the original length of the accompaniment $s_{Acc}(n)$ and thereby all frequencies are multiplied by the factor of the transposition value transpose_val(n), which yields the transposed accompaniment $s_{Acc}^*(n)$. In step 75, the transposed accompaniment $s_{Acc}^*(n)$ is output as result of the transposer 17.

In this embodiment the audio output signal is x*(n) is equal to the accompaniment $s_{Acc}(n)$. In general, the same process as described above in FIG. 7 can be applied to another audio output signal is x*(n). For example, in another embodiment the audio output signal is x*(n) may be equal to the audio input signal x(n). In this case the same transposition as described above in FIG. 7 is applied to the audio output signal is x*(n). In this case the output signal of the transposer might be named transposed signal s*(n).

The time-scale modification phase-vocoder and the resampling is described in more detail for example in the paper "New phase-vocoder techniques for pitch-shifting, harmonizing and other exotic effects", z published in Proc. 1999 IEEE Workshop on Applications of Signal Processing to Audio and Acoustics, New Paltz, New York, Oct. 17-20, 1999 or in the papers mentioned therein. Still further an improved phase-vocoder is explained in more detail for example in the paper, "Improved Phase Vocoder Time-Scale Modification of Audio", by Jean Laroche and Mark Dolson, published in IEEE transactions on speech and audio processing, vol. 7, no. 3, May 1999.

In case that the transposition value transpose_val(n) is smaller than 1, the steps 73 and 74 of FIG. 7 might be interchanged.

As described above, as well as the pitch ratio $P_\omega(n)$ can be determined on-line for every sample n the transposed accompaniment $s_{Acc}^*(n)$ can be determined on-line for every n depending on the current transposition value transpose_val (n) (this can also be viewed as a transposition key) and can then be applied to the whole song in real-time.

If a the pitch ratio $P_\omega(N)$ (and thereby the transposition value transpose_val(n)) for a chosen karaoke song and for a specified user is known in advance, as described above, the transposed accompaniment $s_{Acc}^*(n)$ may also be determined in advance.

As described above, the accompaniment $s_{Acc}(n)$ as output by the MSS 12 (see FIG. 2), can for example include all instruments (tracks) like for example drums, piano, strings etc. In this case the transposition process of the transposer is as descried in FIG. 7 directly applied to the "complete" accompaniment $s_{Acc}(n)$ (also called polyphonic pitch transposition). The polyphonic pitch transposition may result in lower quality than the single-track pitch transposition (see FIG. 11) because it may be difficult to tackle very different attack/release, melodic/percussive, multi note-on note-off for a track with multiple instruments. Therefore, artifacts like pre-echo for percussive parts, comb/flange effects for melodic parts may occur.

As described above, the pitch ratio ratio $P_\omega(n)$ can also be stated in semitones or full tones and exactly the same is true for the transposition value transpose_val(n).

Still further in another embodiment, the audio input signal x(n) may be available as a MIDI (Musical Instrument Digital Interface), and therefore the accompaniment $s_{Acc}(n)$, or the single tracks of the accompaniment may be available as MIDI file as well. In this case the transposition of the MIDI file accompaniment $s_{Acc}(n)$ can be achieved by standard MIDI commands like a transposition filter. That means in this case the transposition is performed by simply transposing the key of the MIDI track by the desired transposition value transpose_val(n) prior to the instrument synthesis.

Therefore, the above described transposer is able to process any type of recording (synthesized MIDI, third party cover, or commercially released recordings) wherein the transposition quality may be improved to by the high separation quality and pitch analysis and transposition value determination.

Singing Effort Determination

Figure 8:
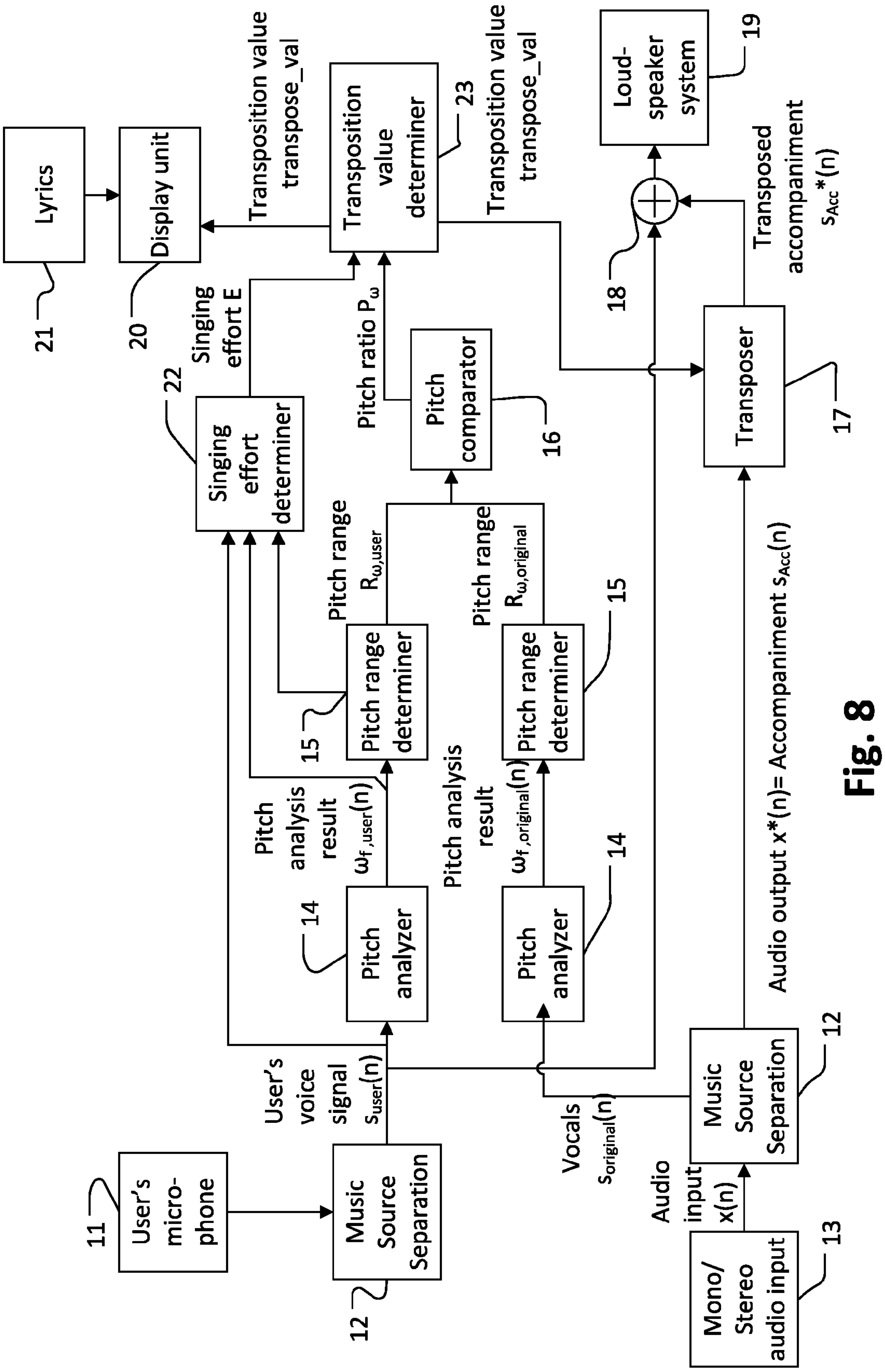
FIG. 8 schematically shows a second embodiment of a process of a of a karaoke systems which transposes an audio signal based on audio source separation and pitch range estimation FIG. 9 schematically describe a singing effort determiner of FIG. 8

FIG. 8 schematically shows a second embodiment of a process of a of a karaoke systems which transposes an audio signal based on audio source separation and pitch range estimation. An audio input signal x(n), which is received from a mono or stereo audio input 13, contains multiple sources (see 1, 2, . . . , K in FIG. 2) and is input to a process of Music Source Separation 12 and decomposed into separations (see separated source 2 and residual signal 3 in FIG. 2), here into a separated source 2, namely original vocals $s_{original}(n)$, and a residual signal 3, namely accompaniment $s_{Acc}(n)$. An exemplary embodiment of the process of Music Source Separation 2 is described in FIG. 2 below. The audio output signal is x*(n) is equal to the accompaniment $s_{Acc}(n)$ and the audio output signal is x*(n) is transmitted to an transposer 17 and the original vocals $s_{original}(n)$ are transmitted to a signal adder 18 and a pitch analyzer 14 (more detail in FIG. 3) which estimates a pitch analysis result $\omega_{f,original}(n)$ of the original vocals $s_{original}(n)$. The pitch analysis result $\omega_{f,original}(n)$ is input into a pitch range estimator 15 (described in more detail in FIG. 4) which estimates a pitch range $R_{\omega,original}$ of the original vocals $s_{original}$ (n). The pitch range $R_{\omega,original}$ is input into a pitch comparator 16. A User's microphone 11 acquires an audio input signal y(n), which is input int to a process of Music Source Separation 12 and decomposed into separations (see separated source 2 and residual signal 3 in FIG. 2), here into a separated source 2, namely, namely user vocals $s_{user}$ (n), and a residual signal 3 which is not needed in the following. The user's vocals $s_{original}(n)$ are transmitted to a singing effort determiner 22, to the signal adder 18 and to a pitch analyzer 14 (more detail in FIG. 3) which estimates a pitch analysis result $\omega_{f,user}(n)$ of the user vocals $s_{original}(n)$. The pitch analysis result $\omega_{f,user}(n)$ is input into a pitch range estimator 15 (described in more detail in FIG. 4) which estimates a pitch range $R_{\omega,user}$ of the user vocals $s_{user}(n)$. The pitch range $R_{\omega,user}$ is input into a pitch comparator 16. The pitch range estimator 16 (described in more detail in FIG. 5) receives the pitch range $R_{\omega,original}$ of the original vocals $s_{original}(n)$ and the pitch range $R_{\omega,user}$ of the user vocals $s_{user}(n)$ and outputs a pitch ratio $P_\omega$ between the pitch of an average of pitch range $R_{\omega,original}$ of the original vocals $s_{original}(n)$ and an average of the pitch range $R_{\omega,user}$ of the user vocals $s_{user}$ (n). The pitch ratio $P_\omega$ is input into transposition value determiner 23. The singing effort determiner 22 receives the user's vocals $s_{original}(n)$, pitch analysis result $\omega_{f,user}(n)$ of the user vocals $s_{original}(n)$ and the pitch range $R_{\omega,user}$ of the user vocals $s_{user}((n)$ and determines a singing effort (see FIG. 9). The singing effort determiner 22 outputs a singing effort flag E which is input into the transposition value determiner 23. The transposition value determiner 23 determines a transposition value transpose_val, based on the pitch ratio $P_\omega$ and the singing effort flag E. The transposition value determiner 23 outputs the transposition value transpose_val into a transposer 17. The transposer receives the transposition value transpose_val and the audio output signal is x*(n) (=accompaniment $s_{Acc}(n)$) and transposes the audio output signal is x*(n) (=accompaniment $s_{Acc}(n)$) by the transposition value transpose_val. The transposer 17 outputs a transposed accompaniment $s_{Acc}^*(n)$ and inputs it into a signal adder 18. The signal adder 18 receives the transposed accompaniment $s_{Acc}^*(n)$ and the original vocals $s_{original}(n)$ and adds them together and outputs the added signal to a loudspeaker system 19. The transposition value transpose_val is further output to a display unit 20 where the value is presented to the user. The display unit 20 further receives lyrics of the user vocals $s_{user}(n)$ and presents them to the user.

Singing Effort and Vocal Pathologies

The karaoke system can further estimate a singing effort of a karaoke user. The singing effort indicates if a karaoke user has great effort to reach the pitch range of the original song, i.e. if the karaoke user must make high efforts to sing as high or as low as the original song. If amateur karaoke user sings beyond his natural capabilities for a longer period of time, the user will not be able to stand long singing sing sessions and could damage his vocal cords and the quality of the performance will be bad.

There are different characteristic parameters which can be deduced from an analysis of the user vocals $s_{user}$ (n) and or the user's pitch analysis result $\omega_{f,user}(n)$ which indicate a high singing effort. These different characteristic parameters are for example:

- A jitter value (in percent /%/), which is is a relative evaluation of the period-to-period (very short-term) variability of user's pitch analysis result $\omega_{f,user}(n)$ within a analyzed voice sample, wherein voice break areas are excluded.

- A RAP value (in percent /%/), which is is a relative evaluation of the period-to-period variability of the pitch within the analyzed voice sample with a smoothing factor of three periods, wherein voice break areas are excluded.
- A shimmer value (in percent /%/), which is a relative evaluation of the period-to-period (very short term) variability of the peak-to-peak amplitude within the analyzed voice sample, wherein voice break areas are excluded.
- A APQ value (in percent /%/), which is a relative evaluation of the period-to-period variability of the peak-to-peak amplitude within the analyzed voice sample at the smoothing of 11 periods, wherein voice break areas are excluded.
- A Noise-to-Harmonic-Ratio (NHR) value, which is the average ratio of the inharmonic spectral energy in the 1500-4500 Hz frequency range to the harmonic spectral energy in the 70-4500 Hz frequency range. This is a general evaluation of the noise present in the analyzed signal.
- A soft phonation index (SPI) value, which is the average ratio of the lower-frequency harmonic energy in the range of 70-1600 Hz to the higher-frequency harmonic energy in the range of 1600-4500 Hz. This parameter reflects the approximation of vocal folds. High values of SPI are stated to correlate with incomplete vocal fold adduction and are a better indicator of breathiness than EGG. NHR and SPI are both computed using a pitch-synchronous frequency-domain method.

A more in depth analysis of the above mentioned parameters and ways to measure and detect them based on the user vocals $s_{user}$ (n) and or the user's pitch analysis result $\omega_{f,user}$(n) is describe in the scientific paper "Vocal Folds Disorder Detection using Pattern Recognition Methods", J. Wang and C. Jo, published in 2007 29th Annual International Conference of the IEEE Engineering in Medicine and Biology Society, Lyon, 2007, pp. 3253-3256, doi: 10.1109/IEMBS.2007.4353023.

Most of the above parameters are related to the vocal cords. Some of these are related to expressiveness while singing as well, like jitter (vibrato), but exhibiting progressive chaotic vocal cord behavior through the karaoke singing session might be an indicator of developing short-term vocal cord issues like swelling. The NHR value could be as well used to detect aphonia as well. The karaoke system can monitor these above described and its variations over a karaoke session of a user and determine the singing effort and a possible vocal cord damage (for example through progressive degradation of singing quality).

Figure 9:
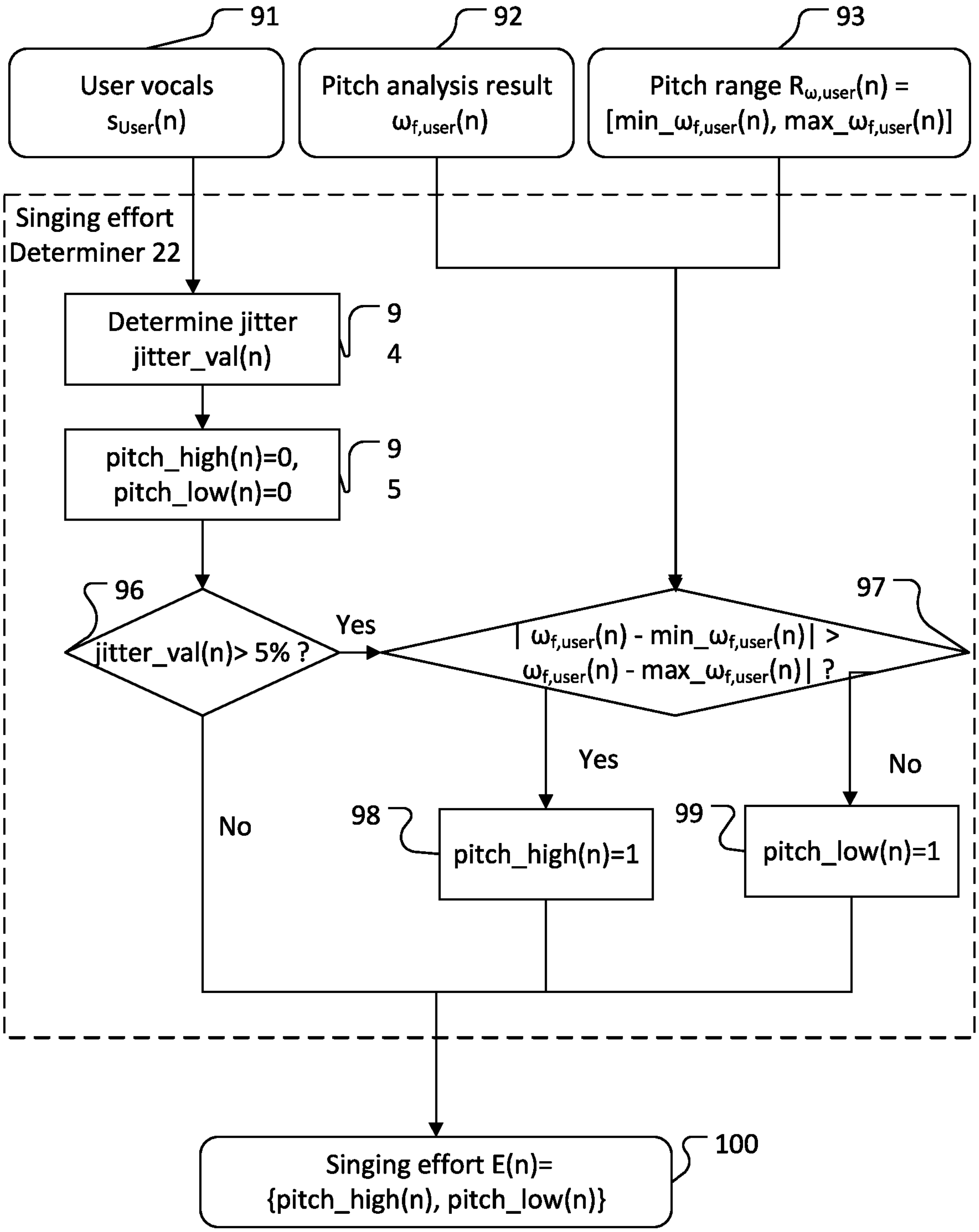

FIG. 9 schematically describe a singing effort determiner 22 of FIG. 8. In step 91, the user vocals $s_{user}$ (n) is received as input into the singing effort determiner 22. In step 92, the user's pitch analysis result $\omega_{f,user}$(n) is received as input into the singing effort determiner 22. In step 93, the pitch range $R_{\omega,user}$(n)=[min_$\omega_{f,user}$((n), max_$\omega_{f,user}$(n)] of the user's vocals $s_{user}$(n) is received as input into the singing effort determiner 22. In step 94, the jitter value jitter_val is determined based on the user's pitch analysis result $\omega_{f,user}$(n) and the user vocals $s_{user}$(n). This is described in more detail in the paper of J. Wang and C. Jo which was cited above the papers cited therein. In step 95, a first singing effort value pitch_high(n) is initialized with pitch_high(n)=0, wherein the first singing effort value pitch_high(n) indicates, if set to 1, that a karaoke singer must make great effort, or fails, to reach a high pitch. Still further in step 95, a second singing effort value pitch_low(n) is initialized with pitch_low(n)=0, wherein a second singing effort value pitch_low(n) indicates, if set to 1, that a karaoke singer must make great effort, or fails, to reach a low pitch. In step 96, it is tested if the jitter value jitter_val(n) is greater than a threshold of 5%. In another embodiment the threshold for the jitter can have another value. If the query from step 96 is answered with yes, it is proceeded with step 97. In step 97, it is tested if the absolute value of the difference of the user's pitch analysis result $\omega_{f,user}$(n) and low value the pitch range $R_{\omega,user}$(n) is greater than the absolute value of the difference of the user's pitch analysis result $\omega_{f,user}$(n) and high value the pitch range $R_{\omega,user}$(n), $|\omega_{f,user}$(n)−min_$\omega_{f,user}$(n)|>|$\omega_{f,user}$(n)−max_$\omega_{f,user}$(n)|. If the query from step 97 is answered with yes, it is proceeded with step 98. In step 98, the first singing effort value pitch_high(n) is set to 1, pitch_high(n)=1 and it is proceeded with step 100. If the query from step 97 is answered with no, it is proceeded with step 99. In step 99, the second singing effort value pitch_low(n) is set to 1, pitch_low(n)=1 and it is proceeded with step 100. If the query in step 96 is answered with no, it is proceeded with step 100. In step 100 the singing effort E(n)={pitch_low(n), pitch_high(n)} is output by the singing effort determiner 22.

In the embodiment above singing effort E(n) is a "binarized" value of the jitter value jitter_val(n), i.e. a flag was set when it was above a threshold and the flag was not set when it was below the threshold. In another embodiment the singing effort E(n) can be a quantitative value, for example a value that is direct proportional to the jitter value jitter_val(n).

In yet another embodiment any of the other above described different characteristic parameters can be used instead of the jitter or in addition in order to determine a first and a second singing effort value as described in FIG. 9.

In yet another embodiment the singing effort E(n) can be a quantitative value, for example a value that is direct proportional to any linear or nonlinear combination above described different characteristic parameters.

In another embodiment the karaoke system can propose to stop or pause singing to prevent more severe vocal cord problems. More details how to recognize pathological speech, which can also be utilized to detect a high singing effort are for example described in "A system for automatic recognition of pathological speech", by: Dibazar, Alireza & Narayanan, Shrikanth, published in Proceedings of the Asilomar Conference on Signals, Systems and Computers, November 2002. In this paper standard MFCC and pitch features are used for the classification of several speech production related pathologies.

If the singing effort determiner 22 has determined the singing effort value E and a pitch ratio Pu, a transposition value transpose_val can be determined.

Figure 10:
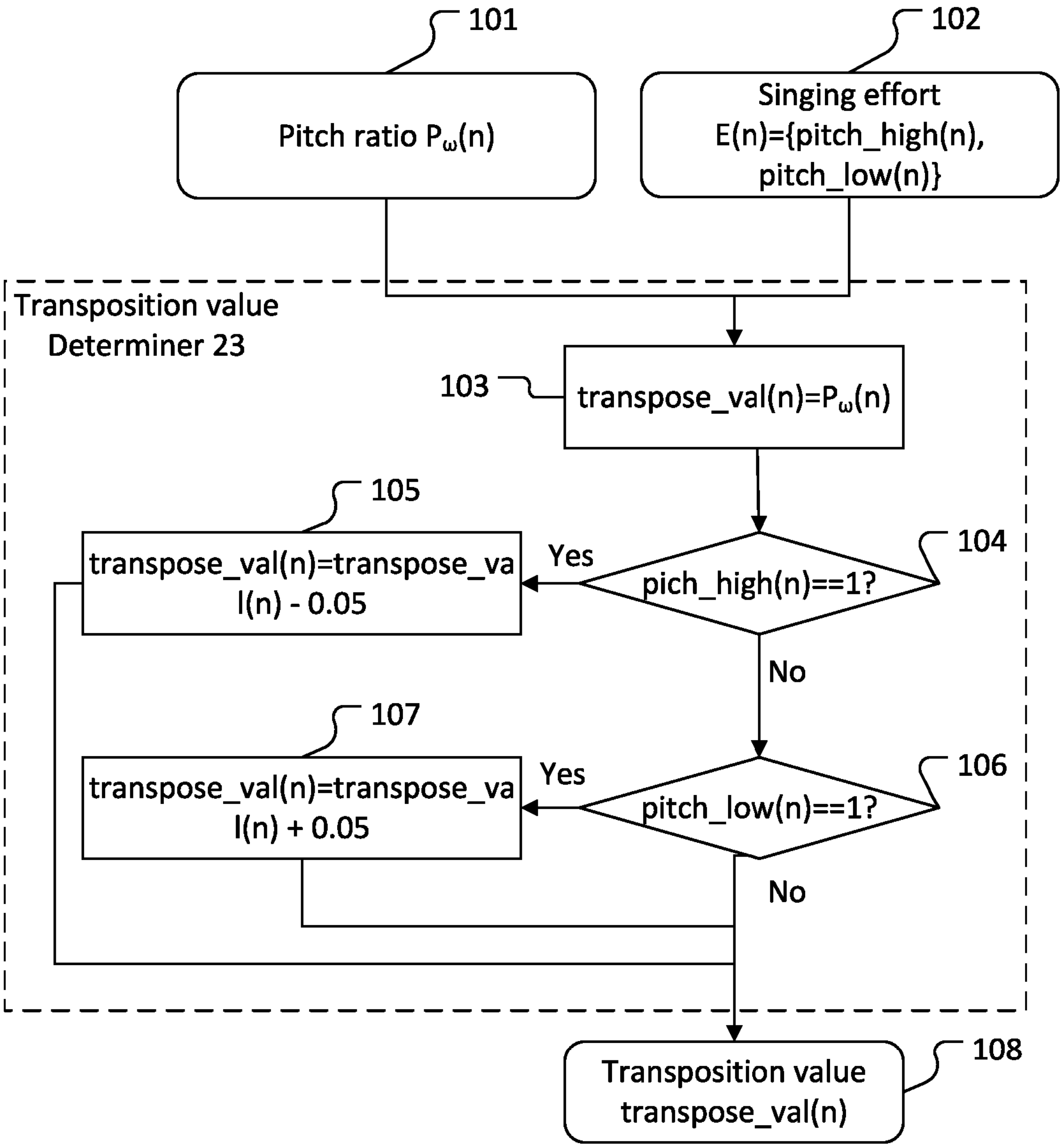
FIG. 10 schematically shows the transposition value determiner of FIG. 8.

FIG. 10 schematically shows the transposition value determiner 23 of FIG. 8. In step 101, the pitch ratio $P_\omega$ is received as input into the transposition value determiner 23. In step 102, the singing effort E={pitch_low(n), pitch_high(n)} is received as input into the transposition value determiner 23. In step 103, the pitch ratio $P_\omega$ is set equal to a transposition value transpose_val(n), transpose_val(n)=$P_\omega$. In step 104, it is tested if the first singing effort value pitch_high is set to 1. If the query in step 104 is answered with yes, it is proceeded with step 105. In step 105, the transposition transpose_val value is decreased by 0.05, transpose_val(n)=transpose_val−0.05 and it is proceeded with step 108. If the query in step 104 is answered with no it is proceeded with step 106. In step 106, it is tested if the second singing effort value pitch_low is set to 1. If the query in step 106 is answered with yes, it is proceeded with step 107. In n step 107, the transposition value transpose_val(n) is increased by 0.05, transpose_val(n)=transpose_val(n)+ 0.05 and it is proceeded with step 108. In step 108, the transposition value transpose_val is output by the transposition value determiner 23.

Figure 11:
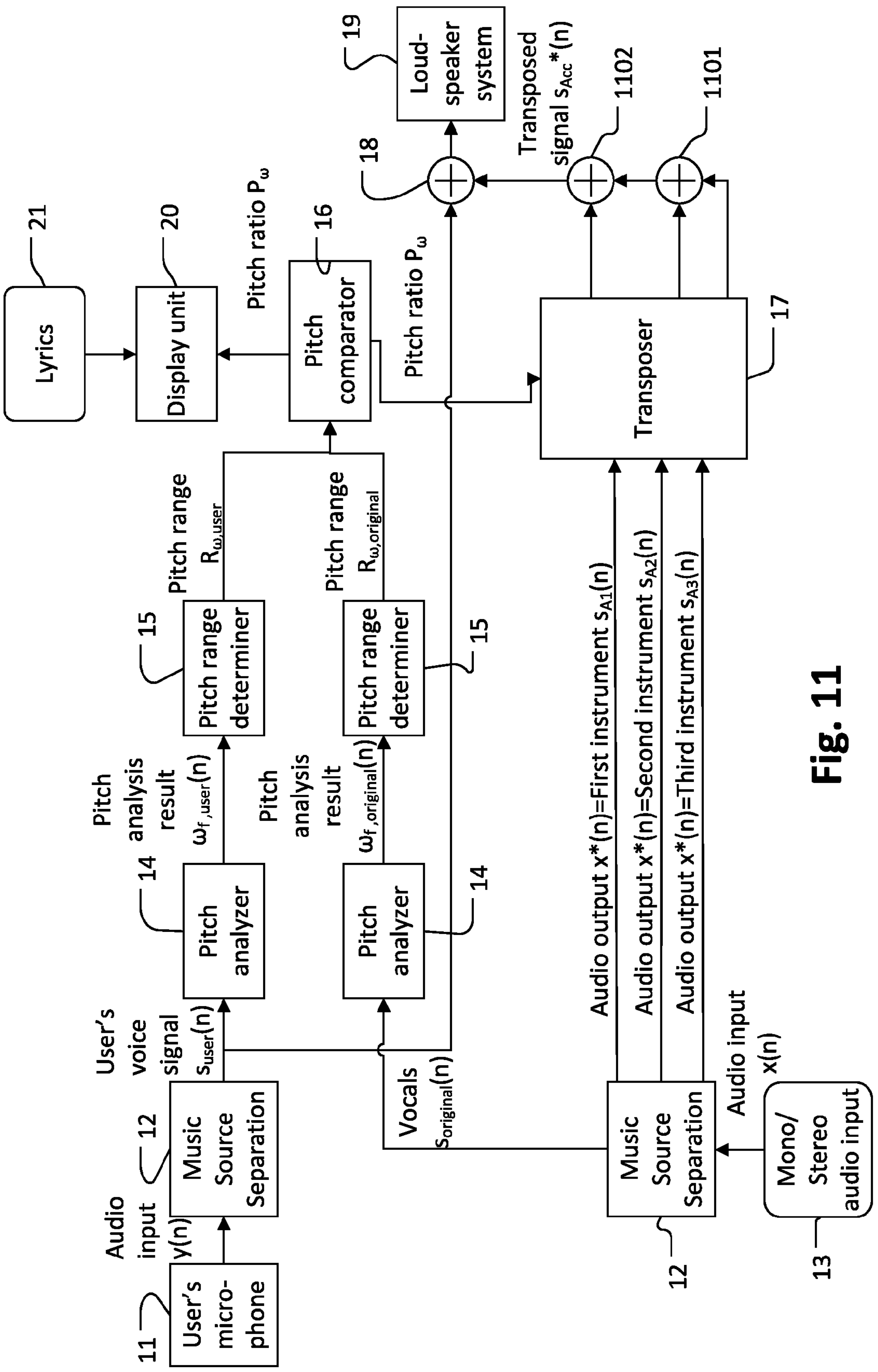
FIG. 11 schematically shows a third embodiment of a process of a of a karaoke systems which transposes an audio signal based on audio source separation and pitch range estimation.

FIG. 11 schematically shows a third embodiment of a process of a of a karaoke systems which transposes an audio signal based on audio source separation and pitch range estimation. The embodiment of FIG. 11 is mostly similar to the embodiment of FIG. 1. However, in FIG. 11 the accompaniment $s_{Acc}(n)$ can be separated by the music source separation 12 into different instruments (tracks), for example a first instrument $s_{A1}(n)$, a second instrument $s_{A2}$ (n) and a third instrument $s_{A3}$ (n)), for example drums, piano, strings etc. Each of the three instruments $s_{A1}(n)$, $s_{A2}$ (n) and $s_{A3}$ (n)) can be set as the output signal x*(n) and transposed by the transposer 17 by the same transposition value as described above in FIG. 7. The transposer 17 outputs for the input of the first instrument $s_{A1}(n)$ a transposed first instrument $s_{A1}^*(n)$, or the input of the second instrument $s_{A2}^*(n)$ a transposed second instrument $s_{A2}^*(n)$ and for the third instrument $s_{A3}$ (n)) a transposed third instrument $s_{A3}^*(n)$). The transposed first instrument $s_{A1}^*(n)$, the transposed second instrument $s_{A2}^*(n)$ the transposed third instrument $s_{A3}^*$ (n)) are summed together by the adders 1101 and 1102 and a the complete transposed accompaniment $s_{Acc}^*(n)$ is received.

In yet another embodiment the accompaniment $s_{Acc}(n)$ can be separated into melodic/harmonic tracks and percussion tracks, and the same single-track (single instrument) transposition as described above can be applied. If the accompaniment $s_{Acc}(n)$ is separated into more than one track (instrument) the transposition process of the transposer 17 is applied to each of the separated tracks individually and the individually transposed tracks are summed up afterwards into a stereo recording to receive the complete transposed accompaniment $s_{Acc}^*(n)$.

Figure 12:
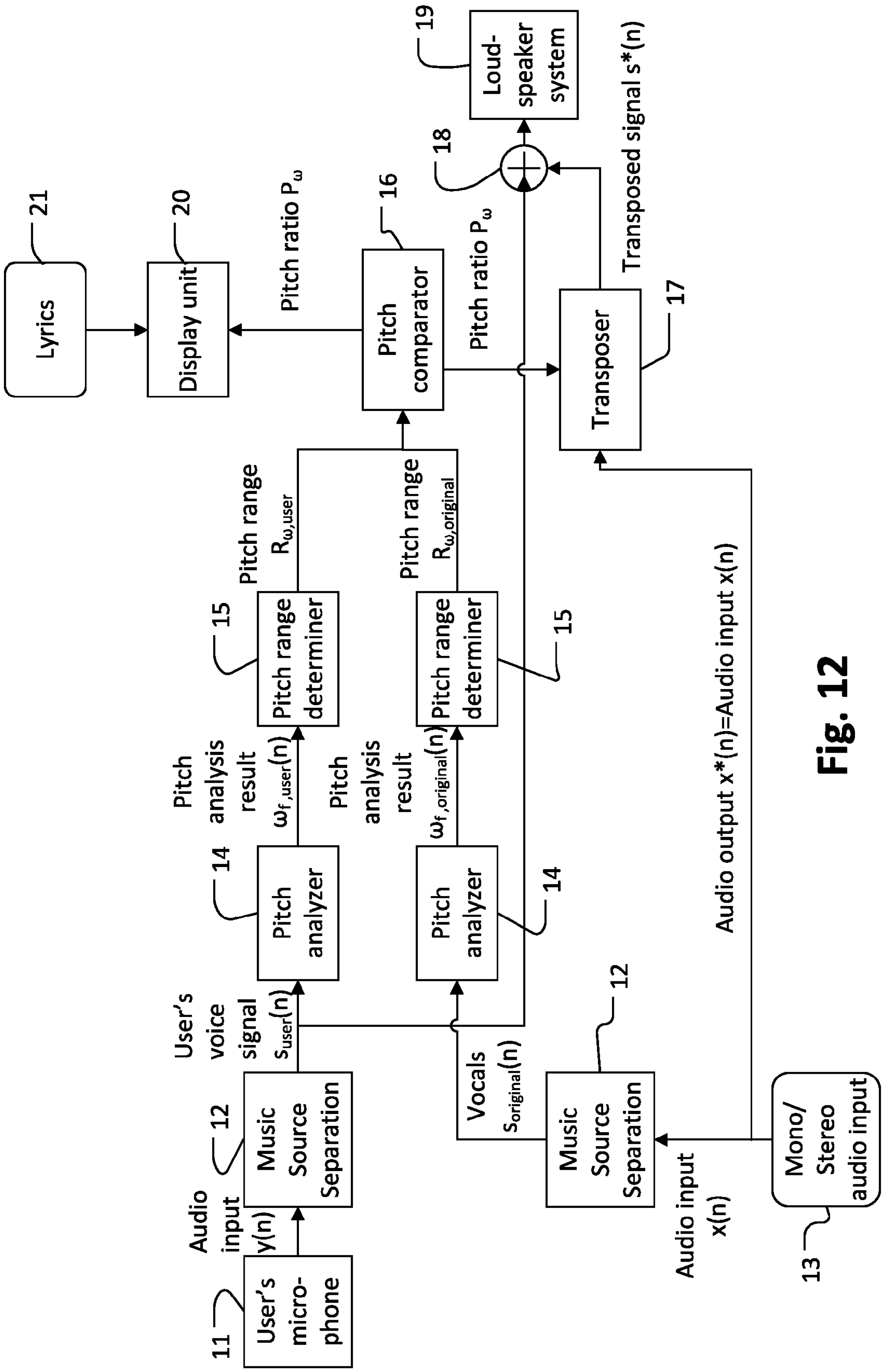
FIG. 12 schematically shows a fourth embodiment of a process of a of a karaoke systems which transposes an audio signal based on audio source separation and pitch range estimation.

FIG. 12 schematically shows a fourth embodiment of a process of a of a karaoke systems which transposes an audio signal based on audio source separation and pitch range estimation. The embodiment of FIG. 12 is mostly similar to the embodiment of FIG. 1. However, in FIG. 12 the audio output signal x*(n) which is transposed by the transposition value transpose_val(n) is equal to the audio input signal x(n), which means that the original vocals $s_{original}(n)$ (and the accompaniment $s_{acc}(n)$) is also transposed by the value transpose_val(n) as described above. The output of the transposer, that is the transposed signal s*(n) is input into the adder 18 and it is proceeded as described in FIG. 1

Figure 13:
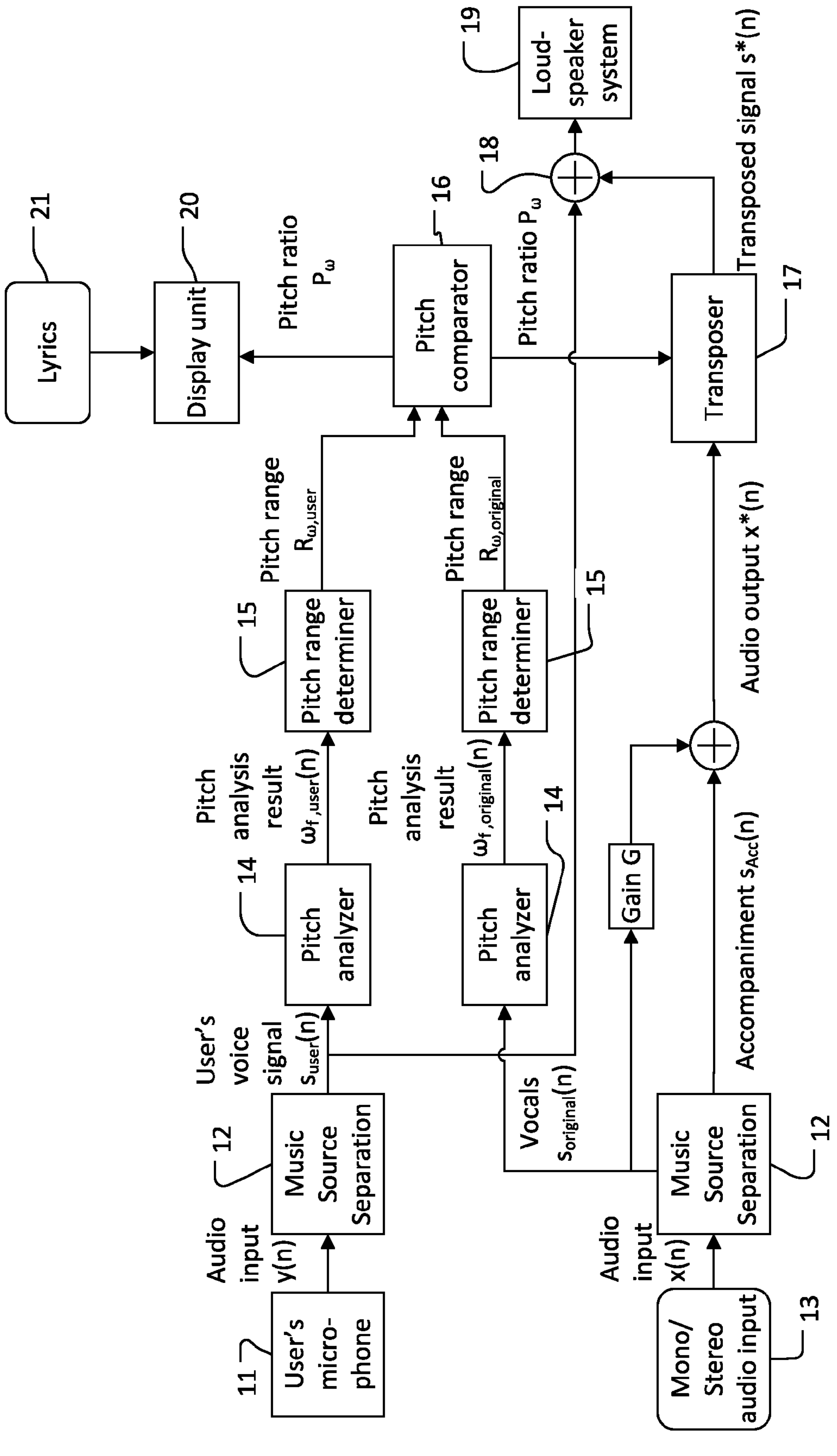
FIG. 13 schematically shows a fifth embodiment of a process of a of a karaoke systems which transposes an audio signal based on audio source separation and pitch range estimation.

FIG. 13 schematically shows a fifth embodiment of a process of a of a karaoke systems which transposes an audio signal based on audio source separation and pitch range estimation. The embodiment of FIG. 13 is mostly similar to the embodiment of FIG. 1. However, in FIG. 13 the audio output signal x*(n) which is transposed by the transposition value transpose_val(n) consists of the original vocals $s_{original}$ (n) mixed together with the accompaniment $s_{acc}(n)$). For example, the output signal x*(n) consists of the original vocals $s_{original}(n)$ which is multiplied by a gain G (that means they are amplified or damped) plus the accompaniment $s_{acc}(n)$). The output of the transposer, that is the transposed signal s*(n) is input into the adder 18 and it is proceeded as described in FIG. 1

Figure 14:
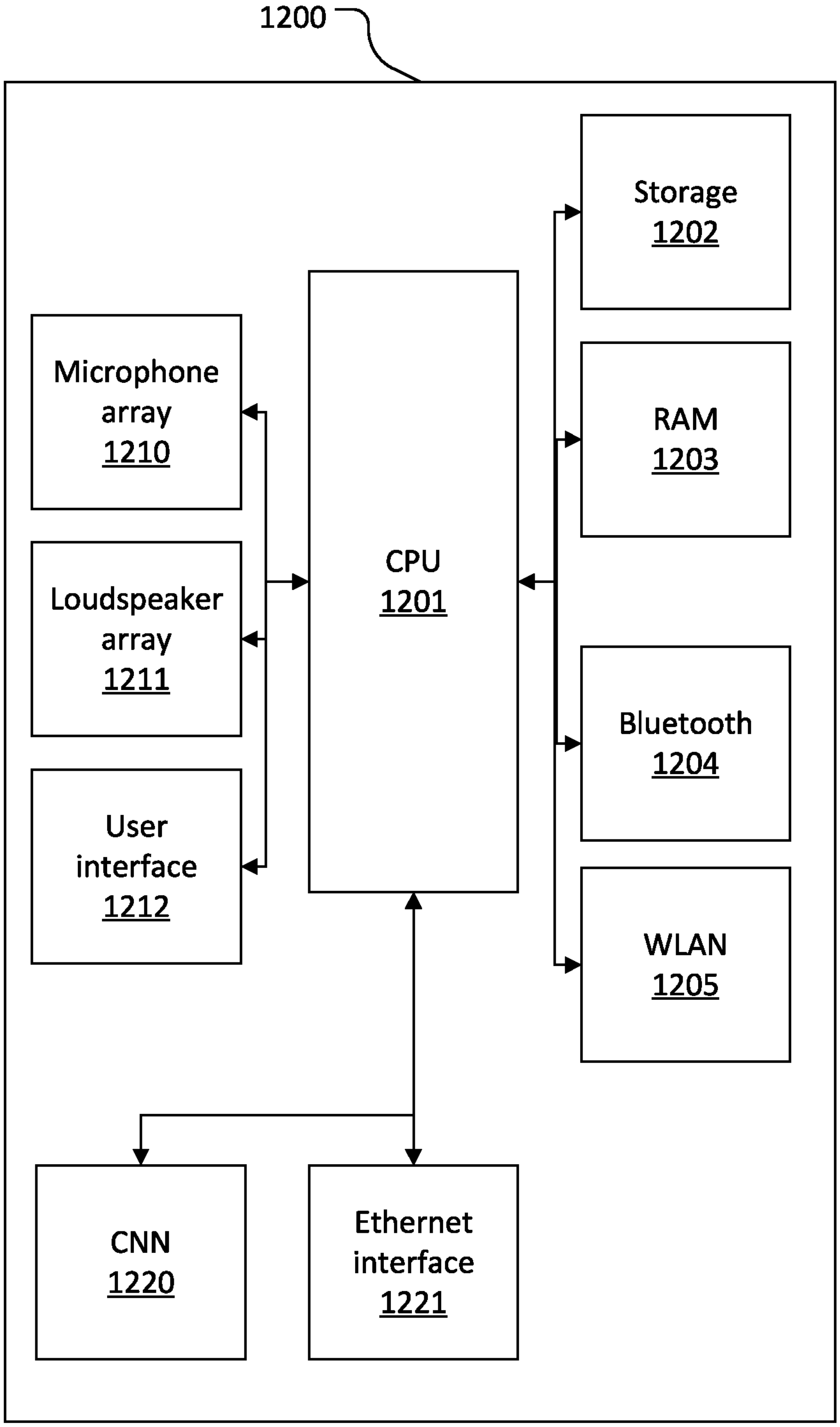
FIG. 14 schematically describes an embodiment of an electronic device that can implement the processes of pitch range determination and transposition as described above.

FIG. 14 schematically describes an embodiment of an electronic device that can implement the processes of pitch range determination and transposition as described above. The electronic device 1200 comprises a CPU 1201 as processor. The electronic device 1200 further comprises a microphone array 1210, a loudspeaker array 1211 and a convolutional neural network unit 1220 that are connected to the processor 1201. The processor 1201 may for example implement a pitch analyzer, a pitch range determiner, a pitch comparator, a singing effort determiner, a transposition determiner or a transposer that realize the processes described with regard to FIG. 1, FIG. 8, FIG. 3, FIG. 4, FIG. 5, FIG. 6, FIG. 7, FIG. 9 and FIG. 10 in more detail. The CNN 1220 may for example be an artificial neural network in hardware, e.g. a neural network on GPUs or any other hardware specialized for the purpose of implementing an artificial neural network. The CNN 1220 may for example implement a source separation 104. A Loudspeaker array 1211, such as the Loudspeaker system 111 described with regard to FIG. 1, FIG. 8 consists of one or more loudspeakers that are distributed over a predefined space and is configured to render any kind of audio, such as 3D audio. The electronic device 1200 further comprises a user interface 1212 that is connected to the processor 1201. This user interface 1212 acts as a man-machine interface and enables a dialogue between an administrator and the electronic system. For example, an administrator may make configurations to the system using this user interface 1212. The electronic device 1200 further comprises an Ethernet interface 1221, a Bluetooth interface 1204, and a WLAN interface 1205. These units 1204, 1205 act as I/O interfaces for data communication with external devices. For example, additional loudspeakers, microphones, and video cameras with Ethernet, WLAN or Bluetooth connection may be coupled to the processor 1201 via these interfaces 1221, 1204, and 1205. The electronic device 1200 further comprises a data storage 1202 and a data memory 1203 (here a RAM). The data memory 1203 is arranged to temporarily store or cache data or computer instructions for processing by the processor 1201. The data storage 1202 is arranged as a long-term storage, e.g. for recording sensor data obtained from the microphone array 1210 and provided to or retrieved from the CNN 1220. The data storage 1202 may also store audio data that represents audio messages, which the public announcement system may transport to people moving in the predefined space.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding.

It should also be noted that the division of the electronic device of FIG. 1 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to separate by audio source separation a first audio input signal (x(n)) into a first vocal signal ($s_{original}$ (n)) and an accompaniment ($s_{Acc}$(n); $s_{A1}$(n), $s_{A2}$(n), $s_{A3}$(n)), and to transpose an audio output signal (x*(n)) by a transposition value (transpose_val(n)) based on a pitch ratio ($P_{\omega}$(n)), wherein the pitch ratio ($P_{\omega}$(n)) is based on comparing a first pitch range ($R_{\omega,original}$(n)) of the first vocal signal ($s_{original}$(n)) and a second pitch range ($R_{\omega,user}$(n)) of the second vocal signal ($s_{user}$(n)).

(2) The electronic device of (1), wherein the circuitry is further configured to determine the first pitch range ($R_{\omega,original}$(n)) of the first vocal signal ($s_{original}$(n)) based on a first pitch analysis result ($\omega_{f,orginal}$(n)) of the first vocal signal ($s_{original}$(n)) and the second pitch range ($R_{\omega,user}$(n)) of the second vocal signal ($s_{user}$ (n)) based on a second pitch analysis result ($\omega_{f,user}$(n)) of the second vocal signal ($s_{user}$ (n)).

(3) The electronic device of (1) or (2), wherein the circuitry is further configured to determine the first pitch analysis result ($\omega_{f,original}$(n)) based on the first vocal signal ($s_{original}$ (n)) and the second pitch analysis result ($\omega_{f,user}$(n)) based on the second vocal signal ($s_{user}$ (n)).

(4) The electronic device of anyone of (1) to (3), wherein the accompaniment ($s_{Acc}$ (n); $s_{A1}$(n), $s_{A2}$ (n), $s_{A3}$ (n)) comprises all parts of the audio input signal (x(n) except for the first vocal signal ($s_{original}$(n)).

(5) The electronic device of of anyone of (1) to (4), wherein audio output signal (x*(n)) is the accompaniment ($s_{Acc}$(n)).

(6) The electronic device of anyone of (1) to (5), wherein the audio output signal (x*(n)) is the audio input signal (x(n)).

(7) The electronic device of anyone of (1) to (6), wherein the audio output signal (x*(n)) is a mixture of the accompaniment ($s_{Acc}$(n)) and the first vocal signal ($s_{original}$ (n))

(8) The electronic device of anyone of (1) to (8), wherein the circuitry is further configured to separate the accompaniment ($s_{A1}$(n), $s_{A2}$(n), $s_{A3}$(n)) into a plurality of instruments ($s_{A1}$(n); $s_{A2}$(n); $s_{A3}$(n)).

(9) The electronic device of anyone of (1) to (8), wherein the circuitry is further configured to separate a second audio input signal (y(n)) by audio source separation.

(10) The electronic device of (9), wherein the second audio input signal (y(n)) is separated into the second vocal signal ($s_{user}$ (n)) and a remaining signal.

(11) The electronic device of anyone of (1) to (10), wherein the circuitry is further configured to determine a singing effort (E (n)) based on the second vocal signal ($s_{user}$ (n)), wherein the transposition value (transpose_val(n)) is based on the singing effort (E(n)) and the pitch ratio (P, (n)).

(12) The electronic device of (11) wherein, the singing effort (E(n)) is based on the second pitch analysis result ($\omega_{f,user}$(n)) of the second vocal signal ($s_{user}$(n)) and the second pitch range ($R_{\omega,user}$(n)) of the second vocal signal ($s_{user}$(n)).

(13) The electronic device of (11) or (12), wherein the circuitry is further configured to determine the singing effort (E(n)) based on a jitter value (jitter_val(n)) and/or a RAP value and/or a shimmer value and/or a APQ value and/or a Noise-to-Harmonic-Ratio and/or a soft phonation index.

(14) The electronic device of anyone of (1) to (13), wherein the circuitry is configured to transpose the audio output signal (x*(n)) based on a pitch ratio (P, (n)), such that transposition value (transpose_val(n)) corresponds to an integer multiple of a semitone.

(15) The electronic device of anyone of (1) to (14), wherein the circuitry comprises a microphone configured to capture the second vocal signal ($s_{user}$(n)).

(16) The electronic device of anyone of (1) to (15), wherein the circuitry is configured to capture the first audio input signal (x(n)) from a real audio recording.

(17) A method comprising:

separating by audio source separation a first audio input signal (x(n)) into a first vocal signal ($s_{original}$(n)) and an accompaniment ($s_{Acc}$(n); $s_{A1}$(n), $s_{A2}$ (n), $s_{A3}$ (n)), and transposing an audio output signal (x*(n)) by a transposition value (transpose_val(n)) based on a pitch ratio ($P_{\omega}$(n)), wherein the pitch ratio ($P_{\omega}$(n)) is based on comparing a first pitch range ($R_{\omega,original}$(n)) of the first vocal signal ($s_{original}$ (n)) and a second pitch range ($R_{\omega,user}$(n)) of the second vocal signal ($s_{user}$(n)).

(18) A computer program comprising instructions, the instructions when executed on a processor causing the processor to perform the method (17).

The invention claimed is:

1. An electronic device comprising circuitry configured to, in real time:

separate by audio source separation a first audio input signal into a first vocal signal and an accompaniment, and transpose an audio output signal by a transposition value based on a pitch ratio, wherein the pitch ratio is based on comparing a first pitch range of the first vocal signal and a second pitch range of a second vocal signal, the second vocal signal corresponds to a user that is singing, and the pitch ratio is selected to cause a smallest transposition of the audio output signal that reduces a signing effort of the user.

2. The electronic device of claim 1 wherein the circuitry is further configured to determine the first pitch range of the first vocal signal based on a first pitch analysis result of the first vocal signal and the second pitch range of the second vocal signal based on a second pitch analysis result of the second vocal signal.

3. The electronic device of claim 2 wherein the circuitry is further configured to determine the first pitch analysis result based on the first vocal signal and the second pitch analysis result based on the second vocal signal.

4. The electronic device of claim 1 wherein the accompaniment comprises all parts of the first audio input signal except for the first vocal signal.

5. The electronic device of claim 1 wherein the audio output signal is the accompaniment.

6. The electronic device of claim 1 wherein the audio output signal is the first audio input signal.

7. The electronic device of claim 1 wherein the audio output signal is a mixture of the accompaniment and the first vocal signal.

8. The electronic device of claim 1 wherein the circuitry is further configured to separate the accompaniment into a plurality of instruments.

9. The electronic device of claim 1 wherein the circuitry is further configured to separate a second audio input signal by audio source separation.

10. The electronic device of claim 9, wherein the second audio input signal is separated into the second vocal signal and a remaining signal.

11. The electronic device of claim 2 wherein the circuitry is further configured to determine the singing effort based on the second vocal signal.

12. The electronic device of claim 11 wherein the singing effort is based on the second pitch analysis result of the second vocal signal and the second pitch range of the second vocal signal.

13. The electronic device of claim 11 wherein the circuitry is further configured to determine the singing effort based on a jitter value and/or a RAP value and/or a shimmer value and/or a APQ value and/or a Noise-to-Harmonic-Ratio and/or a soft phonation index.

14. The electronic device of claim 1, wherein the circuitry is configured to transpose the audio output signal based on the pitch ratio, such that transposition value corresponds to an integer multiple of a semitone.

15. The electronic device of claim 1, wherein the circuitry comprises a microphone configured to capture the second vocal signal.

16. The electronic device of claim 1, wherein the circuitry is configured to capture the first audio input signal from a real audio recording.

17. A method comprising:

separating, in real time, by audio source separation a first audio input signal into a first vocal signal and an accompaniment, and transposing, in real time, an audio output signal by a transposition value based on a pitch ratio, wherein the pitch ratio is based on comparing a first pitch range of the first vocal signal and a second pitch range of a second vocal signal, the second vocal signal corresponds to a user that is singing, and the pitch ratio is selected to cause a smallest transposition of the audio output signal that reduces a signing effort of the user.

18. A non-transitory computer-readable medium encoded with computer-readable instructions that, when executed by processing circuitry, cause the processing circuitry to perform the method of claim 17.

19. The electronic device of claim 1, wherein the first input signal is a MIDI signal.

20. The electronic device of claim 1, wherein the circuitry performs the audio source separation through blind source separation.

* * * * *